United States Patent
Wang et al.

(10) Patent No.: US 9,705,736 B2
(45) Date of Patent: Jul. 11, 2017

(54) METHOD AND SYSTEM FOR A PERSONAL NETWORK

(71) Applicants: Ray Wang, McLean, VA (US); Borwyn Anne Wang, McLean, VA (US); Andrew Wang, McLean, VA (US)

(72) Inventors: Ray Wang, McLean, VA (US); Borwyn Anne Wang, McLean, VA (US); Andrew Wang, McLean, VA (US)

( * ) Notice: Subject to any disclaimer, the term of this patent is extended or adjusted under 35 U.S.C. 154(b) by 66 days.

(21) Appl. No.: 14/638,843

(22) Filed: Mar. 4, 2015

(65) Prior Publication Data
US 2015/0263886 A1     Sep. 17, 2015

Related U.S. Application Data

(60) Provisional application No. 61/953,422, filed on Mar. 14, 2014.

(51) Int. Cl.
| | | |
|---|---|---|
| *H04L 12/28* | (2006.01) | |
| *H04L 12/24* | (2006.01) | |
| *H04L 12/46* | (2006.01) | |
| *H04W 12/02* | (2009.01) | |
| *H04L 29/06* | (2006.01) | |
| *H04W 4/00* | (2009.01) | |

(52) U.S. Cl.
CPC ......... *H04L 41/08* (2013.01); *H04L 12/2809* (2013.01); *H04L 12/4633* (2013.01); *H04L 41/12* (2013.01); *H04L 41/28* (2013.01); *H04W 12/02* (2013.01); *H04L 63/0272* (2013.01); *H04L 63/16* (2013.01); *H04L 63/162* (2013.01); *H04L 63/164* (2013.01); *H04L 63/168* (2013.01); *H04L 2012/2841* (2013.01); *H04W 4/008* (2013.01); *Y02B 60/50* (2013.01)

(58) Field of Classification Search
CPC ... H04L 41/046; H04L 41/048; H04L 41/085; H04L 63/16; H04L 69/24
USPC .................. 370/254, 310, 400, 422, 465
See application file for complete search history.

(56) References Cited

U.S. PATENT DOCUMENTS

| | | | |
|---|---|---|---|
| 7,240,325 B2 * | 7/2007 | Keller ................ | G06F 9/5061 717/104 |
| 7,586,888 B2 | 9/2009 | Wang | |
| 7,630,736 B2 | 12/2009 | Wang | |

(Continued)

*Primary Examiner* — Dmitry H Levitan
(74) *Attorney, Agent, or Firm* — Lesavich High-Tech Law Group, S.C.; Stephen Lesavich

(57) ABSTRACT

A method and system for a personal network. The method and system includes plural mobile location-aware client network devices with minimal CPU processing power and memory with a thin client application that uses secure tunneling/threads to send data to/from a home server network device and/or other server network devices on a personal network. The client devices can be voice activated. The home server network device and/or other server network devices do computational services requested by the plural mobile client network devices on demand and/or pre-programmed services. The secure tunneling/threads are also used across cloud and non-cloud communications network to/from other network devices and/or other mobile client network devices via the home network servers or other server network devices.

20 Claims, 12 Drawing Sheets

(56) References Cited

U.S. PATENT DOCUMENTS

| | | |
|---|---|---|
| 7,801,058 B2 | 9/2010 | Wang |
| 7,937,484 B2 | 5/2011 | Julia et al. |
| 8,195,744 B2 | 6/2012 | Julia et al. |
| 8,195,765 B2 | 6/2012 | Julia et al. |
| 8,224,308 B1 * | 7/2012 | Gavrylyako .......... H04L 67/306 455/405 |
| 8,305,935 B2 | 11/2012 | Wang |
| 8,305,936 B2 | 11/2012 | Wang |
| 8,353,052 B2 | 1/2013 | Larsson et al. |
| 8,411,590 B2 | 4/2013 | Wang |
| 8,427,979 B1 | 4/2013 | Wang |
| 8,463,765 B2 | 6/2013 | Lesavich |
| 8,738,693 B2 | 5/2014 | Julia et al. |
| 8,738,730 B2 | 5/2014 | Julia et al. |
| 8,787,164 B2 | 7/2014 | Julia et al. |
| 8,819,140 B2 | 8/2014 | Julia et al. |
| 8,965,460 B1 | 2/2015 | Rao et al. |
| 8,971,850 B2 * | 3/2015 | Klein ............................ 455/411 |
| 8,973,072 B2 | 3/2015 | Julia et al. |
| 9,037,564 B2 | 5/2015 | Lesavich et al. |
| 9,137,250 B2 | 9/2015 | Lesavich et al. |
| 9,361,479 B2 | 6/2016 | Lesavich et al. |
| 9,390,284 B1 | 7/2016 | Wang et al. |
| 9,569,771 B2 | 2/2017 | Lesavich et al. |
| 2003/0061364 A1 * | 3/2003 | Banerjee ................. H04L 12/14 709/229 |
| 2003/0236821 A1 | 12/2003 | Jiau |
| 2004/0157649 A1 | 8/2004 | Jannard et al. |
| 2006/0026271 A1 | 2/2006 | Julia et al. |
| 2006/0047843 A1 | 3/2006 | Julia et al. |
| 2006/0123053 A1 * | 6/2006 | Scannell ........... G06F 17/30035 |
| 2006/0167985 A1 | 7/2006 | Albanese et al. |
| 2006/0182076 A1 | 8/2006 | Wang |
| 2007/0090996 A1 | 4/2007 | Wang |
| 2007/0286378 A1 | 12/2007 | Brown et al. |
| 2008/0025330 A1 | 1/2008 | Wang |
| 2008/0059188 A1 | 3/2008 | Konopka et al. |
| 2008/0123683 A1 | 5/2008 | Cheng et al. |
| 2008/0300917 A1 | 12/2008 | Ryan et al. |
| 2009/0070884 A1 | 3/2009 | Wu et al. |
| 2009/0189739 A1 | 7/2009 | Wang |
| 2010/0324956 A1 | 12/2010 | Lopez et al. |
| 2011/0019587 A1 | 1/2011 | Wang |
| 2011/0149802 A1 | 6/2011 | Fok Ah Chuen et al. |
| 2011/0208710 A1 | 8/2011 | Lesavich |
| 2011/0210816 A1 | 9/2011 | Wang |
| 2011/0235627 A1 | 9/2011 | Wang |
| 2011/0302620 A1 | 12/2011 | Karaoguz et al. |
| 2012/0136623 A1 * | 5/2012 | Edge ...................... G01S 5/0284 702/150 |
| 2012/0278622 A1 | 11/2012 | Lesavich et al. |
| 2013/0094538 A1 | 4/2013 | Wang |
| 2014/0189792 A1 | 7/2014 | Lesavich et al. |
| 2014/0344420 A1 * | 11/2014 | Rjeili ..................... H04L 43/04 709/220 |
| 2015/0116465 A1 | 4/2015 | Wang et al. |
| 2015/0379301 A1 | 12/2015 | Lesavich et al. |
| 2016/0321654 A1 | 11/2016 | Lesavich et al. |
| 2017/0091854 A1 | 3/2017 | Wang et al. |

* cited by examiner

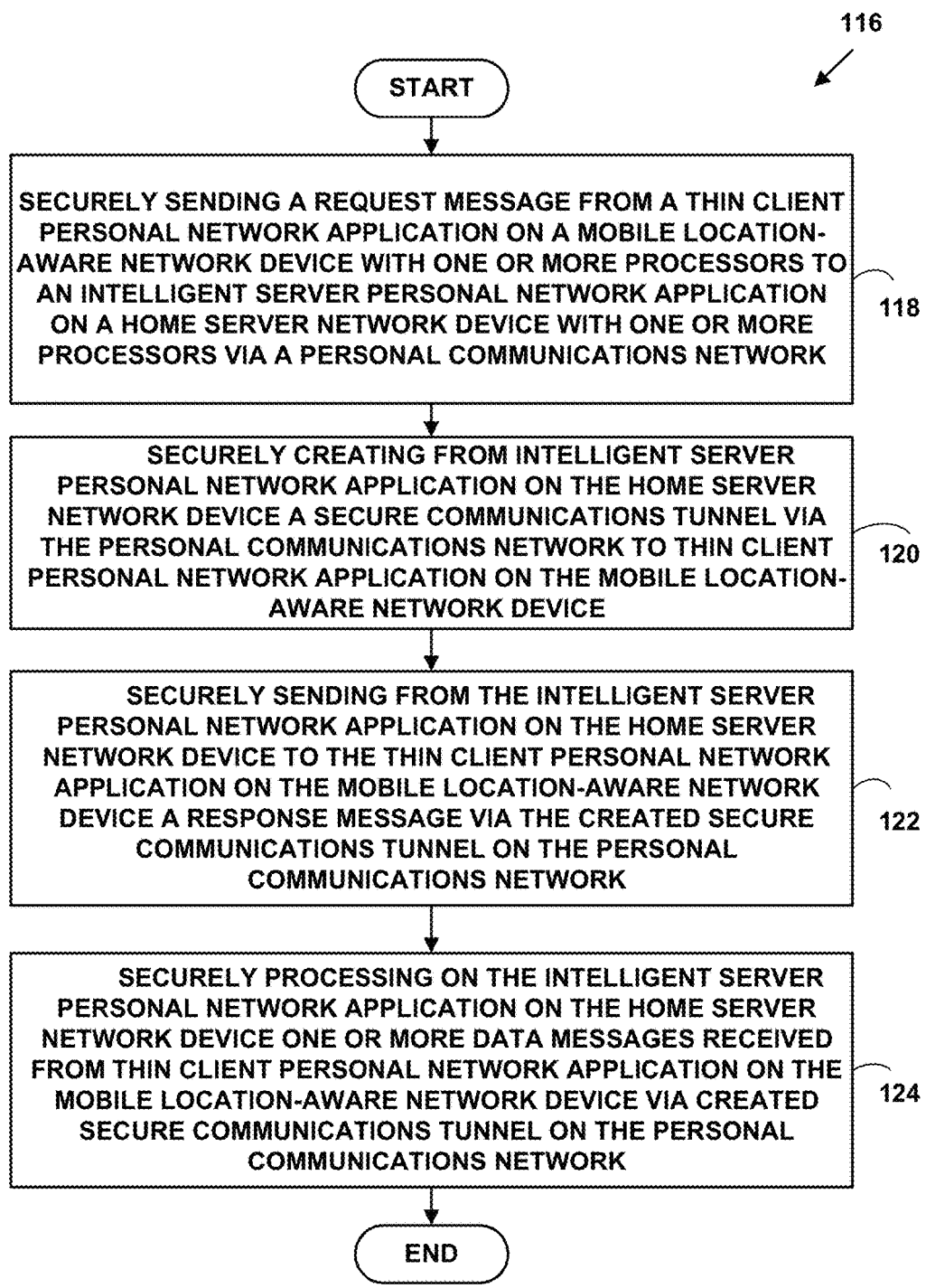

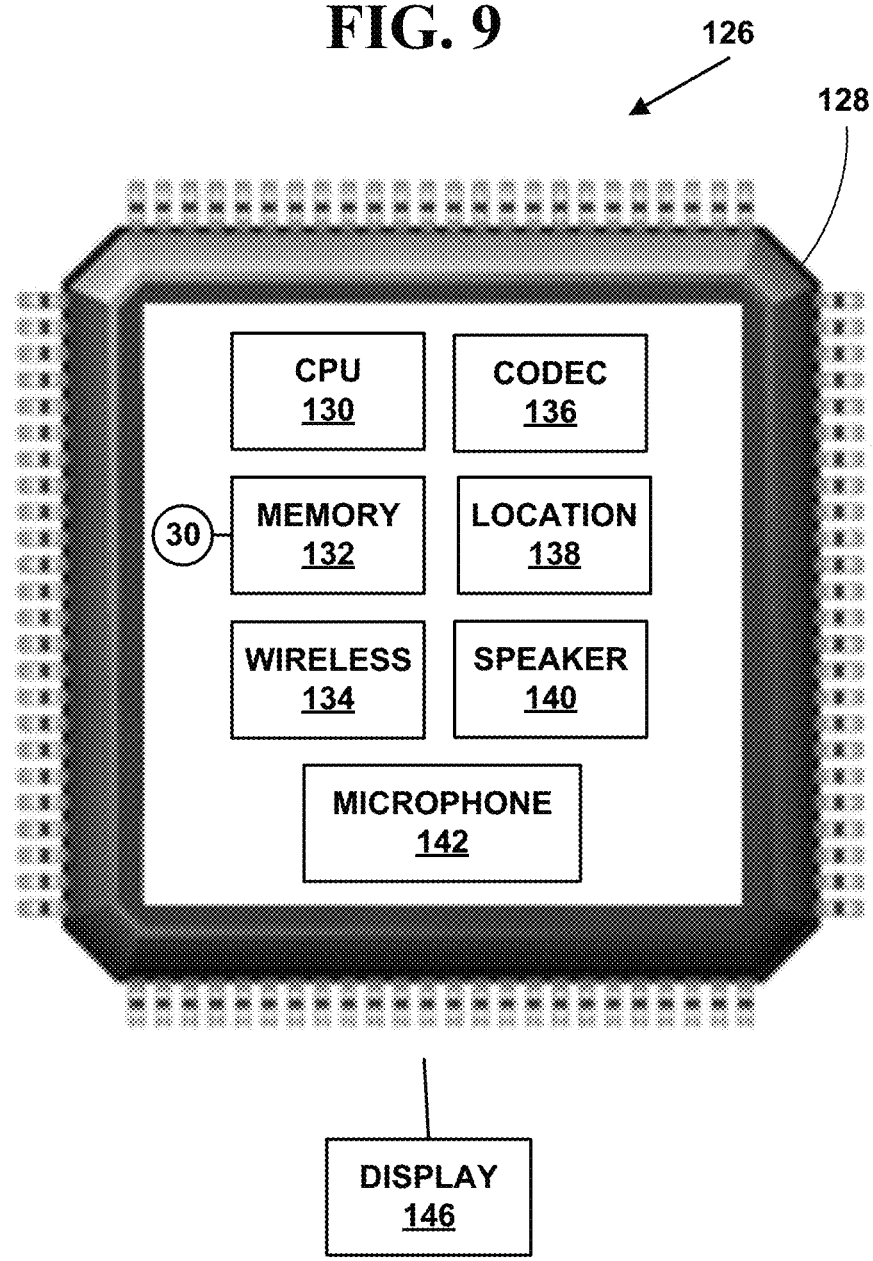

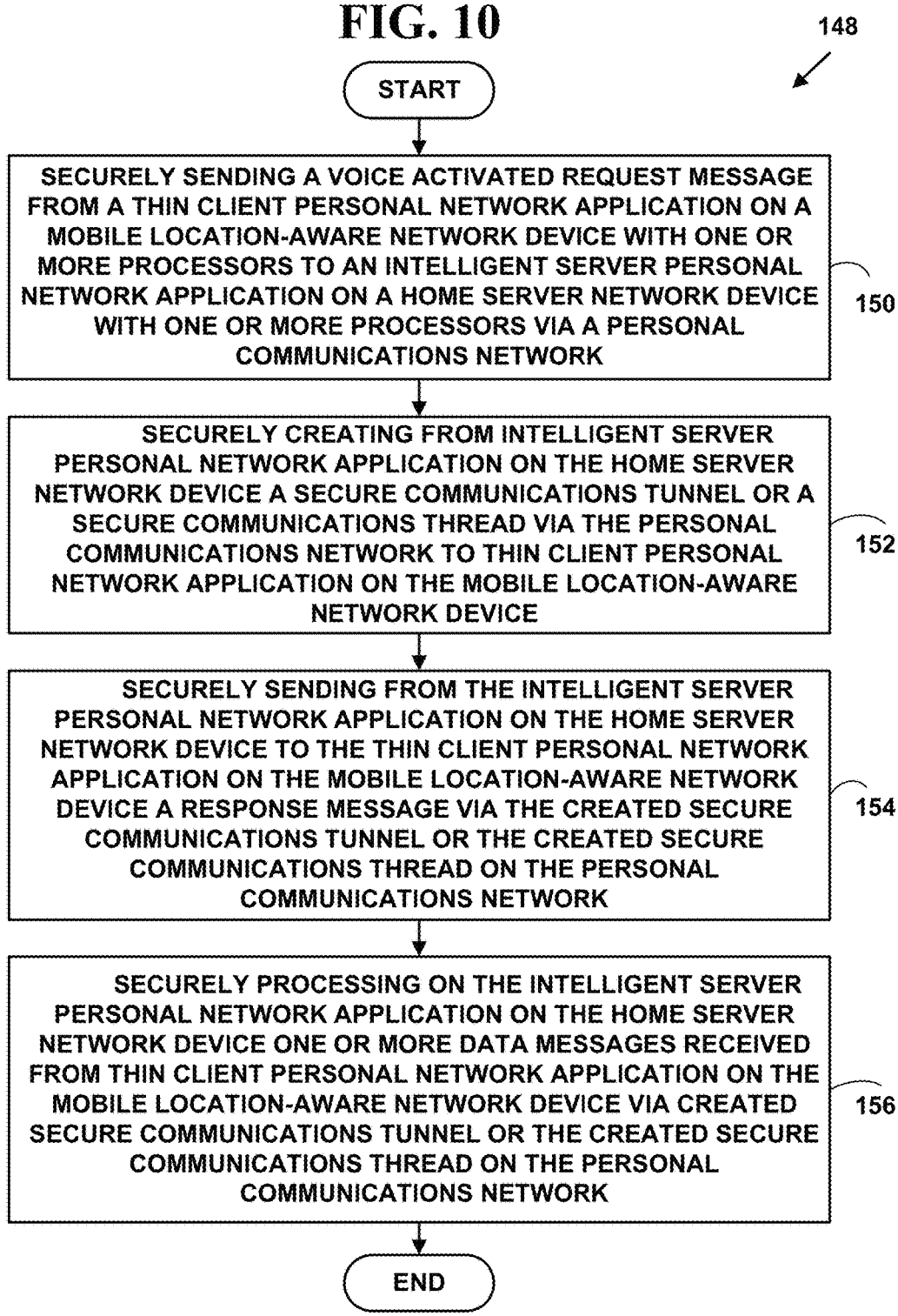

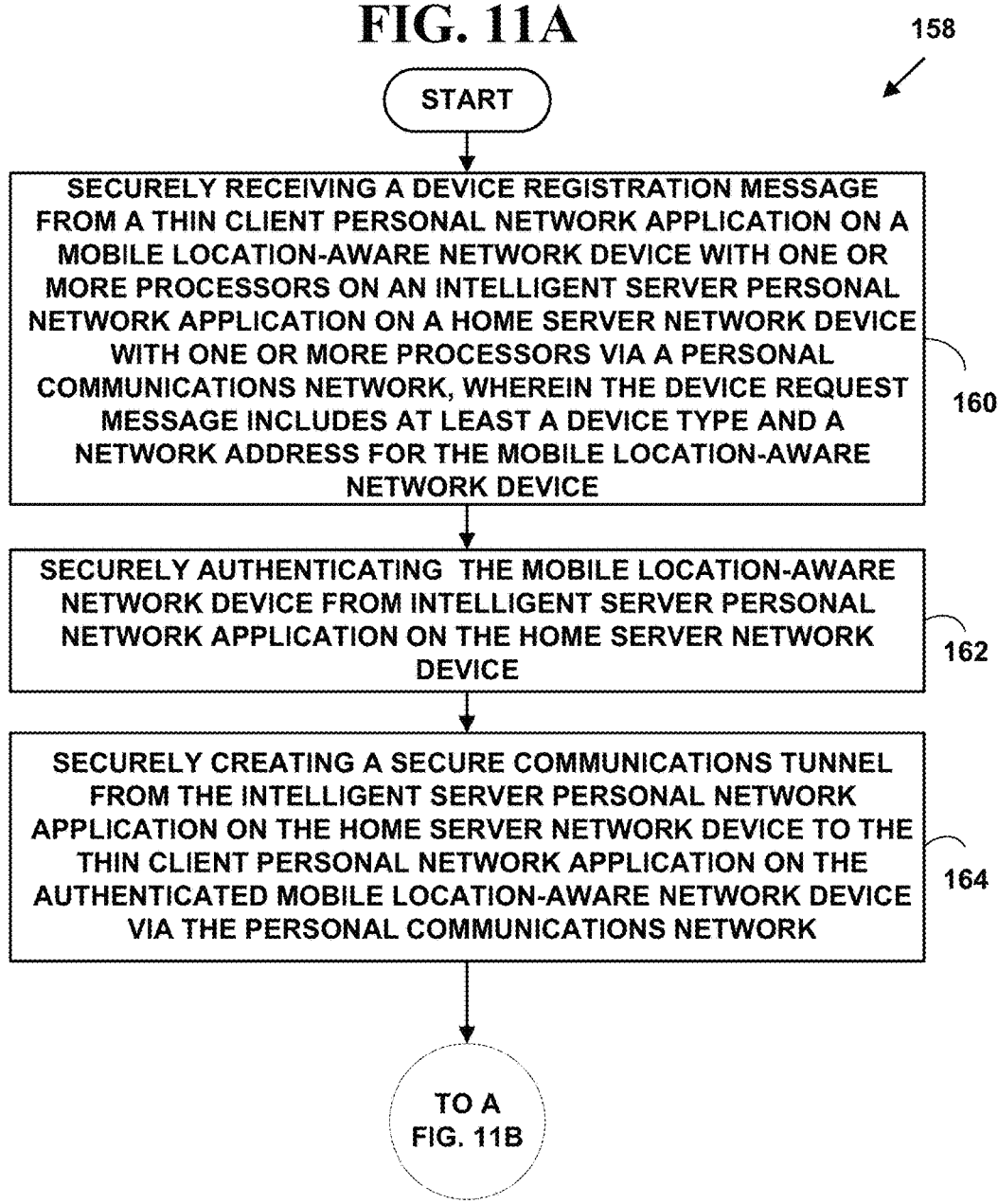

METHOD AND SYSTEM FOR A PERSONAL NETWORK

CROSS REFERENCES TO RELATED APPLICATIONS

This U.S. Utility Application claims priority to U.S. Provisional Patent Application No. 61/953,422, filed on Mar. 14, 2014, the content of which is incorporated by reference.

FIELD OF INVENTION

This invention relates to computer networks. More specifically it relates to a method and system for a personal network.

BACKGROUND OF THE INVENTION

The cost of owning smart phones and tablets and paying associated services are high due to complex phone architecture requires high-speed CPU, more memory, complex human interfaces and growing software executable code size to run many new applications.

One problem with today's smart phone architecture is that it takes a "ALL-IN-ONE" approach, but most consumers only need a few functions One future trend in communication is that low-power voice-activated and recognition maturing technology is becoming the main interface between human and machines. Another trend is that more functionally identical devices will be packaged in different physical shapes and forms such as portable, wearable, or disposable. Voice interaction is the key to the interface to these devices. Therefore, a simple common working architecture is needed to enable the future devices in any shape, form, and style.

In addition, there is growing concern over security and privacy using smart phones and tablets on public networks, like the Internet and on cloud communications networks.

Thus, it is desirable to solve some of the problems associated owning and paying for services associated with smart phones and tablets.

SUMMARY OF THE INVENTION

In accordance with preferred embodiments of the present invention, some of the problems associated owning and maintaining smart phones and tablets are overcome. A method and system for a personal network is presented.

The method and system includes plural mobile location-aware client network devices with minimal CPU processing power and memory with a thin client application that uses secure tunneling/threads to send data to/from a home server network device and/or other server network devices on a personal network. One or more client devices uses own unique identifier to register their existence and capabilities to a server for forming a personal network. The client devices can be voice activated. The home server network device and/or other server network devices do computational services requested by the plural mobile client network devices on demand and/or pre-programmed services. The secure tunneling/threads is also used across cloud and non-cloud communications network to/from other network devices and/or other mobile client network devices via the home network servers or other server network devices.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 8 is a flow diagram illustrating a method for communications on a personal network system;

FIG. 9 is a block diagram illustrating components of a System on Chip (SoC) network device;

FIG. 10 is a flow diagram illustrating a method for communications on a personal network system; and FIGS. 11A and 11B are a flow diagram illustrating a method for communications on a personal network system.

DETAILED DESCRIPTION OF THE INVENTION

Exemplary Cloud Electronic Information Storage and Retrieval System

Figure 1:
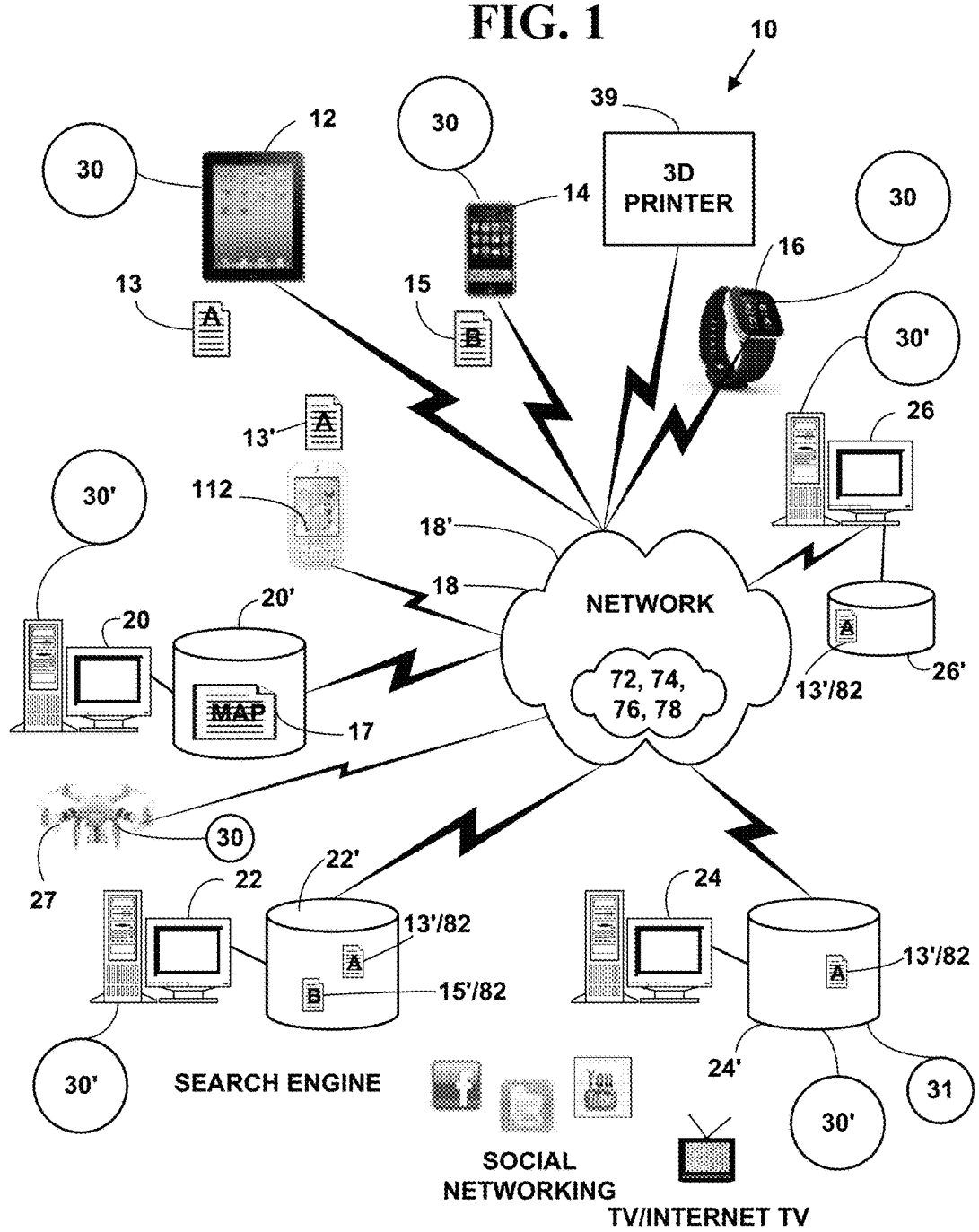
FIG. 1 is a block diagram illustrating an exemplary electronic information storage and retrieval system.

FIG. 1 is a block diagram illustrating an exemplary electronic information storage and retrieval system 10. The exemplary electronic system 10 includes, but is not limited to, one or more target network devices 12, 14, 16 (only three of which are illustrated) each with one or more processors and each with a non-transitory computer readable medium.

The one or more target network devices 12, 14, 16 include, but are not limited to, a location-aware voice activated device, a network display device, multimedia capable desktop and laptop computers, tablet computers, facsimile machines, mobile phones, non-mobile phones with and/or without displays, three-dimensional (3D) printer, robots, smart phones, Internet phones, Internet appliances, personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV), satellite television (SATV) and Internet television set-top boxes, digital televisions including high definition television (HDTV), three-dimensional (3DTV) televisions, wearable devices for medical or non-medical usage, treadmills, exercise bicycles, a remote control, a disposable network device, a portable network device, and other types of network devices. Each target network device has a unique identifier for personal network configuration.

The one or more smart network devices described herein can be used to form a personal network. For example, a voice activated device is registering to a remote server and forming a simple personal network for voice based applications. The voice activated device initiates a voice call request and the remote server retrieves the call information and manages the call connection over the duration of the call. Another example is for a network device to request a retrieval of data content and send it to a registered network display device. Other devices can join to or depart from a personal network based on the need to practice the invention.

A "smart phone" is a mobile phone that offers more advanced computing ability and connectivity than a contemporary basic feature phone. However, all the current smart phones are a type of "ALL-IN-ONE" devices for voice/data communication, camera, search engine, MP3, storage, web applications, which is expensive yet most consumers only need a few functions. The present invention breaks up the "ALL-IN-ONE" architecture into many individual configurable low-cost smart network devices. This allows the user to configure and de-configure applications based on personal need. The smart network device may be physically shared among different users but logically separations. The smart phone cost reduction is achieved through the function of separation and sharing via a configuration of a personal network. However, the present invention is not limited to smart phone and other applications can be used to practice the invention.

Personal network architecture includes three main components: smart network devices, servers, and networks to deliver intelligent, secured and low cost multimedia communications.

The one or more smart network devices 12, 14, 16 include: a portable network device and/or wearable device, such as the iPad, by Apple, Inc., the HP Tablet, by Hewlett Packard, Inc., the Playbook, by RIM, Inc., the Tablet, by Sony, Inc.; a wearable device such as Apple watch by Apple, Inc., Samsung Galaxy watch by Samsung; or other location-aware wearable devices such as RFID tag.

A 3D printer 37 (FIG. 1) include 3D printing or "Additive manufacturing." 3D printing is a process of making a three-dimensional solid object of virtually any shape from a digital model. 3D printing is achieved using an "additive process," where successive layers of material are laid down in different shapes. 3D printing is also considered distinct from traditional machining techniques, which mostly rely on the removal of material by methods such as cutting or drilling and are "subtractive" processes.

In one embodiment, a 3D printer 37 is a limited type of industrial robot that is capable of carrying out an additive process under computer control. The 3D printing technology is used for both prototyping and distributed manufacturing with applications in architecture, construction (AEC), industrial design, automotive, aerospace, military, engineering, civil engineering, dental and medical industries, biotech (human tissue replacement), fashion, footwear, jewelry, eyewear, education, geographic information systems, food, and/or many other fields.

The target network devices 12, 14, 16 once registered to a personal network are in communications with a cloud communications network 18 or a non-cloud computing network 18' via one or more wired and/or wireless communications interfaces. The cloud communications network 18, is also called a "cloud computing network" herein and the terms may be used interchangeably.

A "network topology" is an arrangement of a personal network with the various elements (links, nodes, etc.) of a communications network 18. Essentially, it is the topological structure of the communications network 18 and may be depicted physically or logically. "Physical topology" is the placement of the various component of a network, including device location and cable installation. "Logical topology" illustrates how data flows within a network, regardless of its physical design. Distances between nodes, physical interconnections, transmission rates, or signal types may differ between two networks, yet their topologies may be identical.

In one embodiment, the network topology includes point-to-point, star, ring or circular, mesh, tree, hybrid, or daisy chain topologies. However, the present invention is not limited to these network topologies and other embodiments can be used to practice the invention.

The plural target network devices 12, 14, 16 request desired electronic content 13, 15, etc. such as 3D models for specific 3D modeling programs stored on the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, etc.) securely stores one or more cloud content location maps 17 and other plural server network devices (e.g., 22, 24, 26, etc.) store portions 13', 15' of desired electronic content 13, 15 as cloud storage objects 82 (FIG. 5) as is described herein.

The plural server network devices 20, 22, 24 26, include, but are not limited to, manufacturing machines, 3D printers 39, robots, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
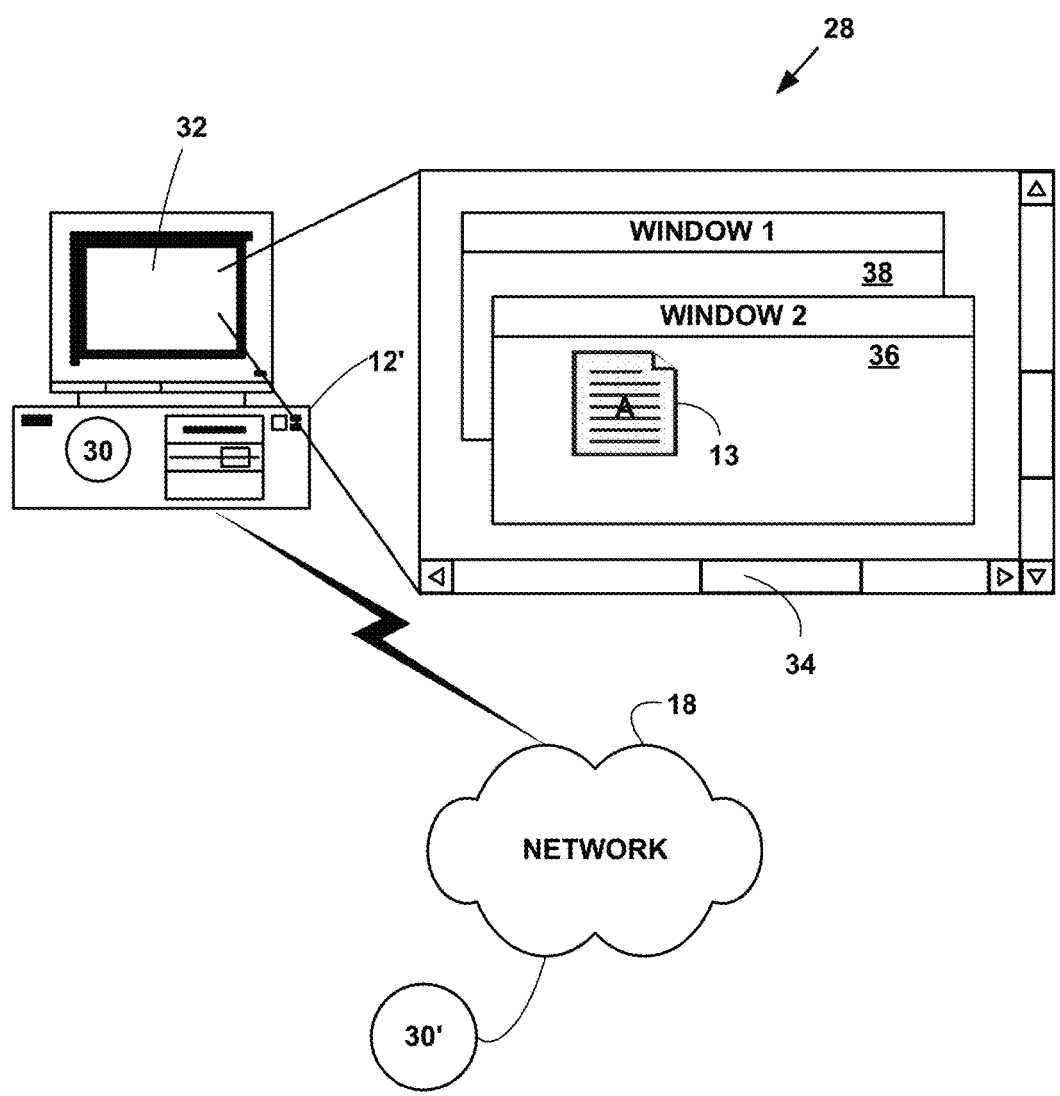
FIG. 2 is a block diagram illustrating an exemplary electronic information display system.

FIG. 2 is a block diagram illustrating an exemplary electronic content information display system 28. The exemplary electronic information system display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 is a mobile application for a smart phone, electronic tablet or other mobile network device. In another embodiment, the application 30, 30' is cloud application used on a cloud communications network 18. However, the present invention is not limited these embodiments and other embodiments can be used to practice the invention In another embodiment, a portion of the application 30 is executing on the target network devices 12, 14, 16 and another portion of the application 30' is executing on the server network devices 20, 22, 24, 26. The applications also include one or more library applications 31. However, the present invention is not limited these embodiments and other embodiments can be used to practice the invention.

In one embodiment, application 30 is executing on the target network devices 12, 14, 16 is a thin-client application 30. A "thin client" (sometimes also called a lean, zero or slim client) is an application that depends heavily on another network device (e.g., a server network device) to fulfill its computational needs. This is different from the traditional "fat client," which is an application designed to take on these roles by itself. The specific roles assumed by the server including providing data storage and electronic information processing on the thin client's behalf.

Thin clients occur as components of a broader computer infrastructure, where many thin clients share their computations with the same server. As such, thin client infrastructures can be viewed as providing some computing service and/or cloud computing services. Thin-client computing is also a way of easily maintaining computational services at a reduced total cost of ownership.

Exemplary Networking Protocol Stack

Figure 3:
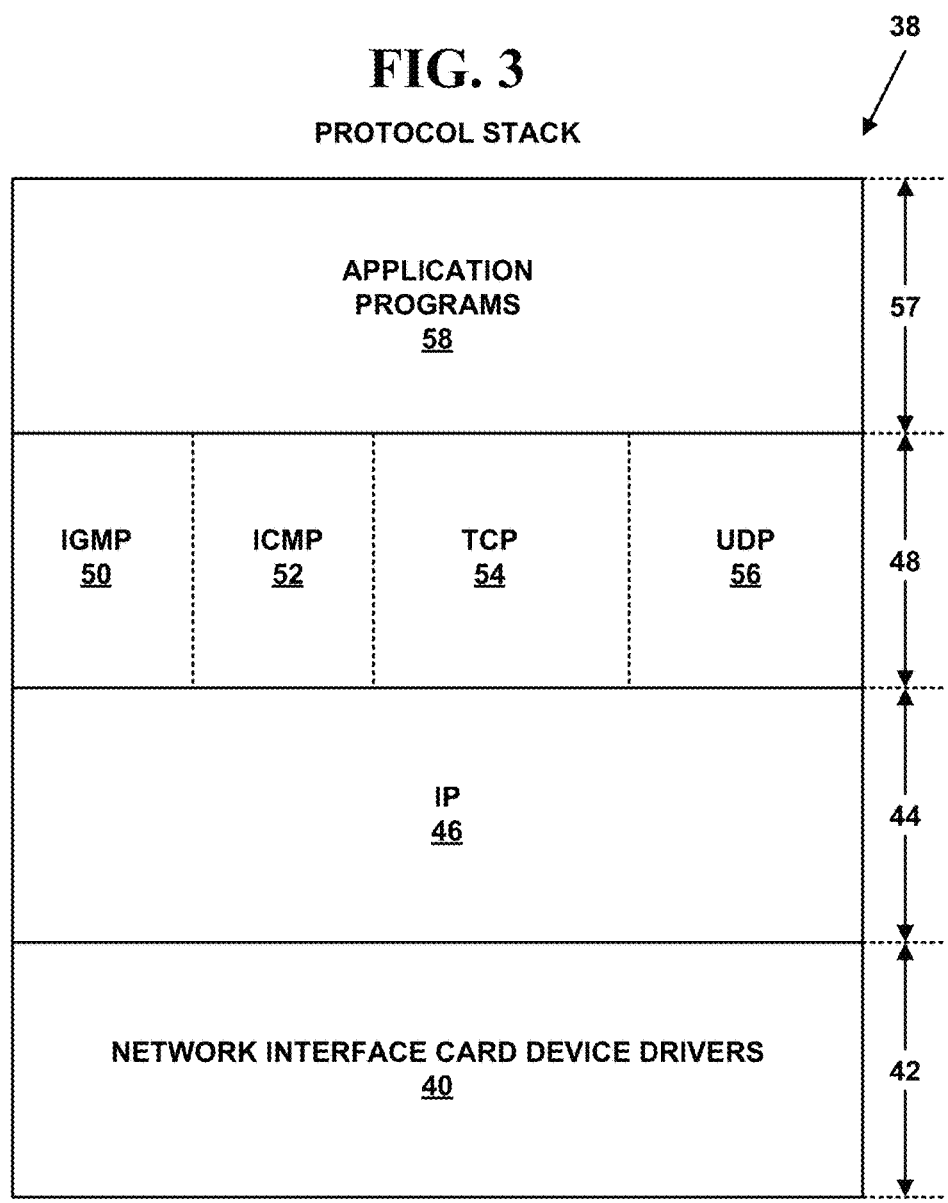
FIG. 3 is a block diagram illustrating an exemplary networking protocol stack.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 20, 22, 24, 26, 27 are connected to the communication network 18 with Network Interface Card (NIC) cards including device drivers 40 in a link layer 42 for the actual hardware connecting the network devices 12, 14, 16, 20, 22, 24, 26, 27 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 54 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 54 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30', etc.) to carry out desired functionality for a network device reside. For example, the application programs 58 for the client network devices 12, 14, 16 may include web-browsers or other application programs, application program 30, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 27 include but are not limited to, Cellular for 3G, 4G or future generations, IEEE 802.11a, 802.11b, 802.11g, 802.11n, 802.15.4 (ZigBee), "Wireless Fidelity" (Wi-Fi), "Worldwide Interoperability for Microwave Access" (WiMAX), Fiber optics, ETSI High Performance Radio Metropolitan Area Network (HIPERMAN), Power line communication (PLC), "RF Home" and/or Global Positioning System (GPS) wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide Wireless Link Prioritization (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can also be used to provide WLP.

In one embodiment, the plural server network devices 20, 22, 24, 26, 27 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, network devices 12, 14, 16, 20, 22, 24, 26, 27 and wired and wireless interfaces including the NICs include "4G" components. "4G" refers to the fourth generation of wireless communications standards and speeds of 100 megabits/second to gigabits/second or more. 4G includes peak speed requirements for 4G service at least 100 Mbit/s for high mobility communication (e.g., trains, vehicles, etc.) and 1 Gbit/s for low mobility communication (e.g., pedestrians and stationary users, etc.).

4G technologies are a successor to 3G and 2G standards. The nomenclature of the generations generally refers to a change in the fundamental nature of the service. The first was the move from analogue (1 G) to digital (2G) transmission. This was followed by multi-media support, spread spectrum transmission and at least 200 Kbits/second (3G). The 4G NICs include IP packet-switched NICs, wired and wireless ultra-broadband (i.e., gigabit speed) access NICs, Worldwide Interoperability for Microwave Access (WiMAX) NICs WiMAX Long Term Evolution (LTE) and/or multi-carrier transmission NICs. However, the present invention is not limited to this embodiment and 1G, 2G and 3G and/or any combination thereof, with or with 4G NICs can be used to practice the invention.

In one embodiment of the invention, the WiMAX interface includes WiMAX 4G Long Term Evolution (LTE) interfaces. The ITU announced in December 2010 that WiMAX and LTE are 4G technologies. One of the benefits of 4G LTE is the ability to take advantage of advanced topology networks including those on cloud communications networks 18 such as optimized heterogeneous networks with a mix of macrocells with low power nodes such as picocells, femtocells and new relay nodes. LTE further improves the capacity and coverage, and helps ensures user fairness. 4G LTE also introduces multicarrier technologies for ultra-wide bandwidth use, up to 100 MHz of spectrum supporting very high data rates.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or sensors.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16 112, 114, server network devices 20, 22, 24, 26, 108, etc.)

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

Global Positioning Systems (GPS) is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. This position is then displayed. Latitude and longitude and/or elevation information may also be displayed. Many GPS units also show derived information such as travel direction and speed, calculated from position changes. The GPS coordinates include standard GPS, GPS map, Digital GPS (DGPS) and/or other types of GPS information.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the applications 30, 30' provide cloud electronic content storage and retrieval services from television services over the cloud communications network 18 or non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the applications 30, 30' provide cloud electronic content storage and retrieval services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the applications 30, 30' provide cloud electronic content storage and retrieval services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the applications 30, 30' provide cloud electronic content storage and retrieval services from general search engine services. In another embodiment, the applications 30, 30' provide general search engine services by interacting with one or more other public search engines (e.g., GOOGLE, BING, YAHOO, etc.) and/or private search engine services.

In another embodiment, the applications 30, 30' provide electronic content storage and retrieval services from specialized search engine services, such as vertical search engine services by interacting with one or more other public vertical search engines (e.g., GALAXY.COM, etc.) and/or private search engine services.

However, the present invention is not limited to such general and/or vertical search engine services and more, fewer and/or other general search engine services can be used to practice the invention.

Social Networking Services

In one embodiment, the applications 30, 30' provide cloud electronic content storage and retrieval services from one more social networking services including to/from one or more social networking web-sites (e.g., FACEBOOK, YOU-TUBE, TWITTER, PINTEREST, INSTAGRAM, MY-SPACE, MATCH.COM, E-HARMONY, GROUP ON, SOCIAL LIVING, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 27 with wired and/or wireless interfaces of the present invention include one or more of the security and encryptions techniques discussed herein for secure communications on the cloud communications network 18 or non-cloud communications network 18' and personal network 106.

Application programs 58 (FIG. 2) include security and/or encryption application programs integral to and/or separate from the applications 30, 30' Security and/or encryption programs may also exist in hardware components on the network devices (12, 14, 16, 20, 22, 24, 26, 27) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference.

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
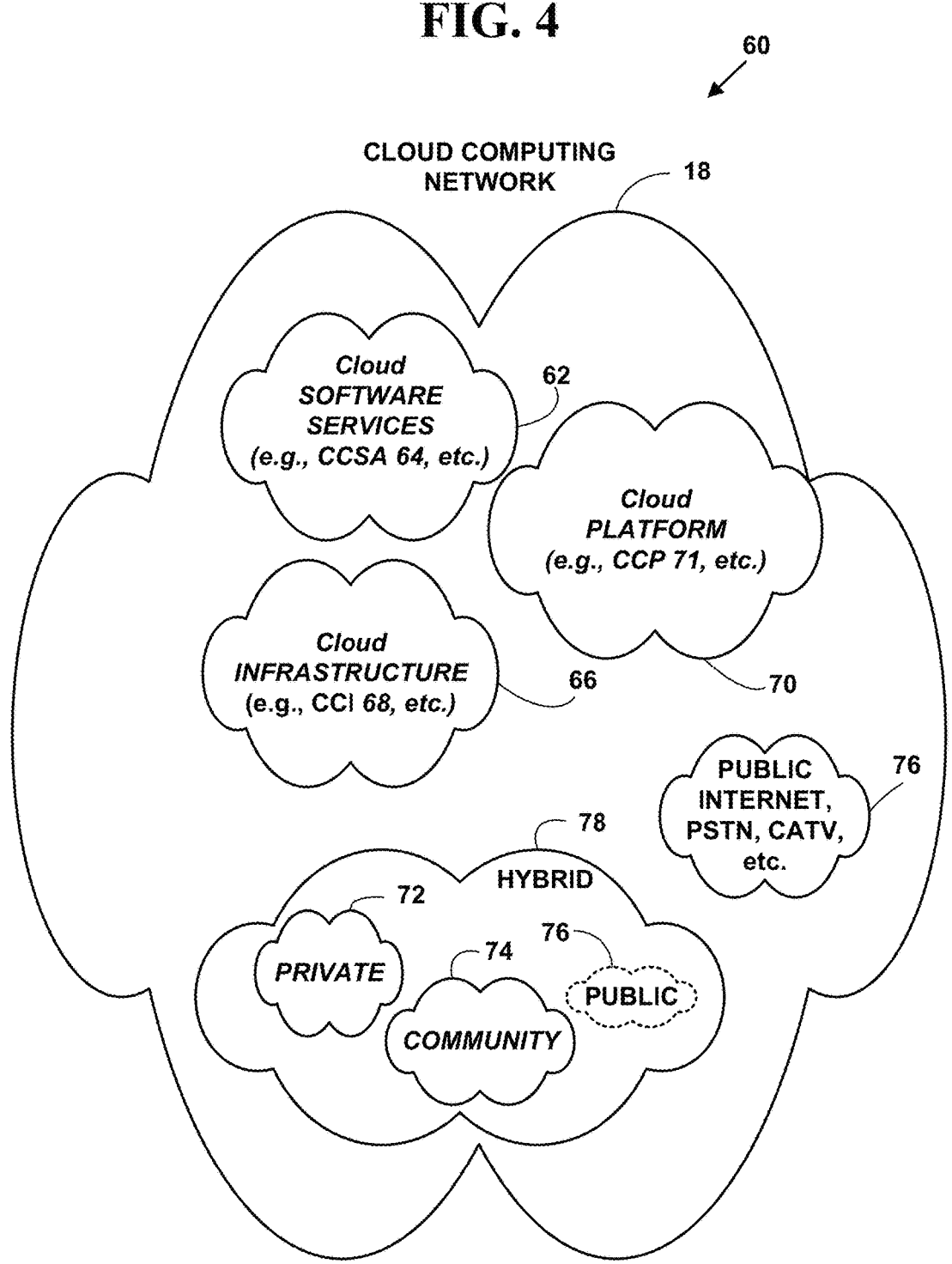
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand personal network services. Personal network services can unilaterally provision computing capabilities, such as server time and network storage, as needed automatically without requiring human interaction with each network server on the cloud communications network 18.
2. Broadband network access. Personal network capabilities are available over plural broadband communications networks and accessed through standard mechanisms that promote use by heterogeneous thin or thick client platforms (e.g., mobile phones, smart phones 14, tablet computers 12, laptops, PDAs, thin client devices, 112, 114, etc.). The broadband network access includes high speed network access such as 3G and/or 4G wireless and/or wired and broadband and/or ultra-broad band (e.g., WiMAX, etc.) network access.
3. Resource pooling. Personal network computing resources are pooled to serve multiple requesters using a multi-tenant model, with different physical and virtual resources dynamically assigned and reassigned according to electronic content retrieval demand. There is location independence in that a requester of personal network services has no control and/or knowledge over the exact location of the provided by the personal network resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for personal network. For personal network data modeling converters, the personal network capabilities available for provisioning appear to be unlimited and can be used in any quantity at any time.
5. Measured Services. Cloud computing systems automatically control and optimize resource use by leveraging a metering capability at some level of abstraction appropriate to the type of personal network service (e.g., storage, processing, bandwidth, custom electronic content retrieval applications, etc.). Electronic personal network usage is monitored, controlled, and reported providing transparency for both the personal network provider and the personal network requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for a personal network Service (CCSA 64). The capability to use the provider's applications 30, 30' running on a cloud infrastructure 66. The cloud computing applications 62, are accessible from the server network device 20 from various client devices 12, 14, 16, 27, 112, 114 through a thin client interface such as a web browser, etc. The user does not manage or control the underlying cloud infrastructure 66 including network, servers, operating systems, storage, or even individual application 30, 30' capabilities, with the possible exception of limited user-specific application configuration settings.
2. Cloud Computing Infrastructure 66 for a personal network Service (CCI 68). The capability provided to the user is to provision processing, storage and retrieval, networks 18, 72, 74, 76, 78, 106 and other fundamental computing resources where the consumer is able to deploy and run arbitrary software, which can include operating systems and applications 30, 30'. The user does not manage or control the underlying cloud infrastructure 66 but has control over operating systems, storage, deployed applications, and possibly limited control of select networking components (e.g., host firewalls, etc.).
3. Cloud Computing Platform 70 for a personal network Service (CCP 71).
The capability provided to the user to deploy onto the cloud infrastructure 66 created or acquired applications created using programming languages and tools supported servers 20, 22, 24, 26, 108 etc.. The user not manage or control the underlying cloud infrastructure 66 including network, servers, operating systems, or storage, but has control over the deployed applications 30, 30' and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for a personal network. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, personal network, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, personal network 106, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30', offers cloud services for personal network. The application 30, 30' offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 62 (SaaS) including a specific cloud software service 62 for personal network. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
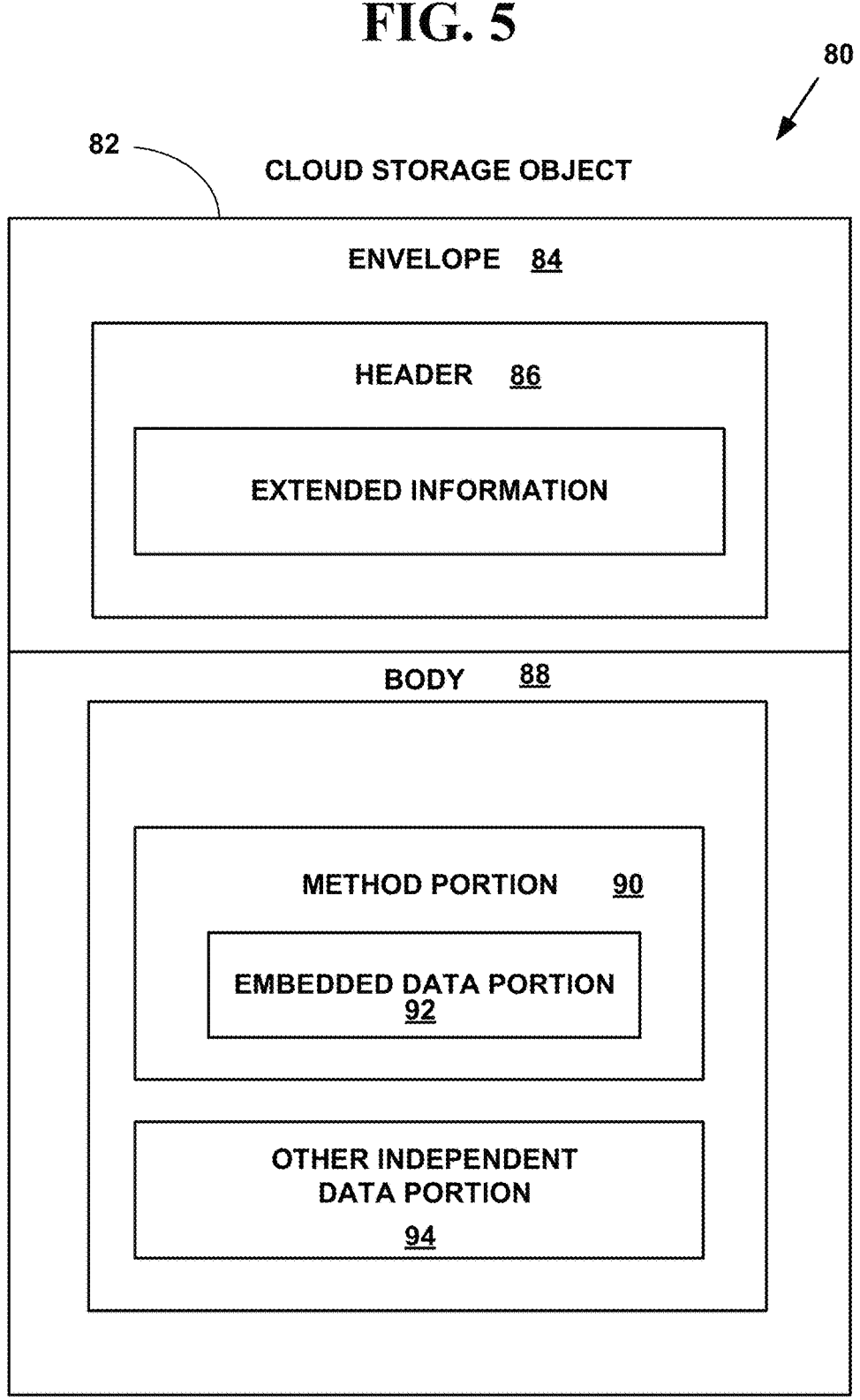
FIG. 5 is a block diagram illustrating an exemplary cloud storage object.

FIG. 5 is a block diagram 80 illustrating an exemplary cloud storage object 82.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78, 106 of the cloud communications network 18. Cloud storage objects 82 includes one or more portions of desired electronic content and can be stored on any of the 72, 74, 76, 78, 106 networks of the cloud communications network 18. Cloud storage objects 82 are transparent to a requester of desired electronic content and are managed by applications 30, 30'.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Wearable Devices

"Wearable technology" and/or "wearable devices" are clothing and accessories incorporating computer and advanced electronic technologies. Wearable network devices provide several advantages including, but not limited to: (1) Quicker access to notifications, Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
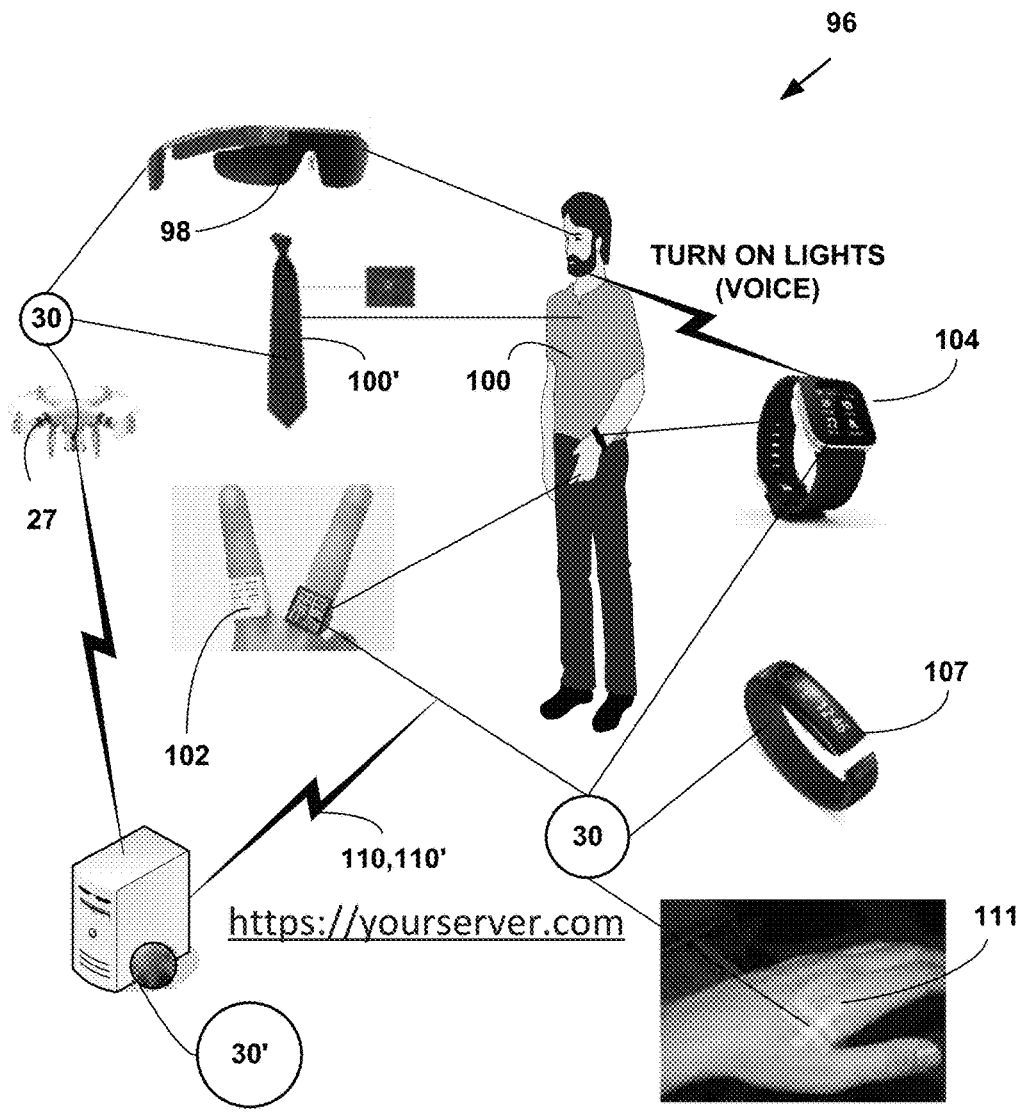
FIG. 6 is a block diagram illustrating wearable devices.

FIG. 6 is a block diagram 96 illustrating wearable devices. The wearable devices include one or more processors and include, but are not limited to, wearable digital glasses or a headset 98, clothing 100 (e.g., smart ties 100', etc.), jewelry 102 (e.g., smart rings, smart earrings, etc.) and/or watches 104. The wearable devices also include health monitoring devices, 107, fitness devices 111 and other types of wearable devices. The wearable devices are also wearable by animals (e.g., service dogs, pets, show animals, circus animals, etc.). In one embodiment, the wearable devices include thin client personal network application 30. However, the present invention is not limited to such embodiments and more, fewer and other types of wearable devices can also be used to practice the invention.

In one specific embodiment, the application 30, 30' interacts with wearable devices 98-104 and a personal net 106.

Unmanned Aerial Vehicles (Drones)

An unmanned aerial vehicle (UAV) 27 (FIG. 1), commonly known as a "drone" and also referred to as a "Remotely Piloted Aircraft (RPA)" by the International Civil Aviation Organization (ICAO), is an aircraft without a human pilot aboard. There are different kind of drones including: (1) UAS (Unmanned Air System); (2) UAV (Unmanned Aerial Vehicle); (3) RPAS (Remote Piloted Aircraft Systems) and (4) Model Aircraft. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs 27 were simple remotely piloted aircraft, but autonomous control is increasingly being employed.

The use of UAVs 27 are typically characterized by altitudes of flights. The following types of UAVs 27 fly at different altitudes, broadly characterized as: (1) Very high altitude (VHA): above 45,000 feet (more than 12 km); (2) High altitude (HA): from 20,000 to 45,000 feet (6 to 12 km); (3) Medium altitude (MA): from 10 to 20,000 feet (3 to 6 km); or (4) Low altitude (LA): between a few hundred and up to 10,000 feet (1 to 3 km).

The specific needs of UAV 27 include required UAV capabilities to allow them to fly in "non-segregated" air-traffic controlled airspace. The requirements placed on mobile links to and from a UAV 27 are required in terms of aeronautical safety due to the fact that these vehicles are unmanned. An air-traffic control (ATC) link includes full automation of communications between on-board and ground systems. A remote pilot (RP) link places additional and more strenuous constraints on the radio communication bearer(s) and systems used in, not necessarily significant as regards the amount of volume of data to be exchanged, in as much as UAV 27 generally possess or will possess their own computerized autonomous flight management system, limiting the remote pilot (RP) interventions to that of supervising and/or re-establishing flight procedures or choosing the most appropriate one, should any contingency arise.

The UAV 27 communicates on Aeronautical Mobile Service (AMS) wireless frequency including, but not limited to: (a) 4400-4940 MHz; (b) 5030 (or 5010)-5090 MHz, (MLS "core" band; (c) 5090-5150 MHz ("MLS" extension band); (d) 5150-5250 MHz; (e) 5925-6700 MHz; (f) 22.5-23.6 GHz; (g) 24.75-25.5 GHz; or (h) 27-27.5 GHz.

Most UAVs 27 have one or more processors, a non-transitory computer readable medium memory, cameras, microphones and other audiovisual equipment that are used to view and collect information objects of interest from the air. The audiovisual signals are typically sent from the UAV's 27 to a remote control center for viewing by an operator. In one embodiment, UAV 27 includes thin client personal network application 30.

Personal Network System

Figure 7:
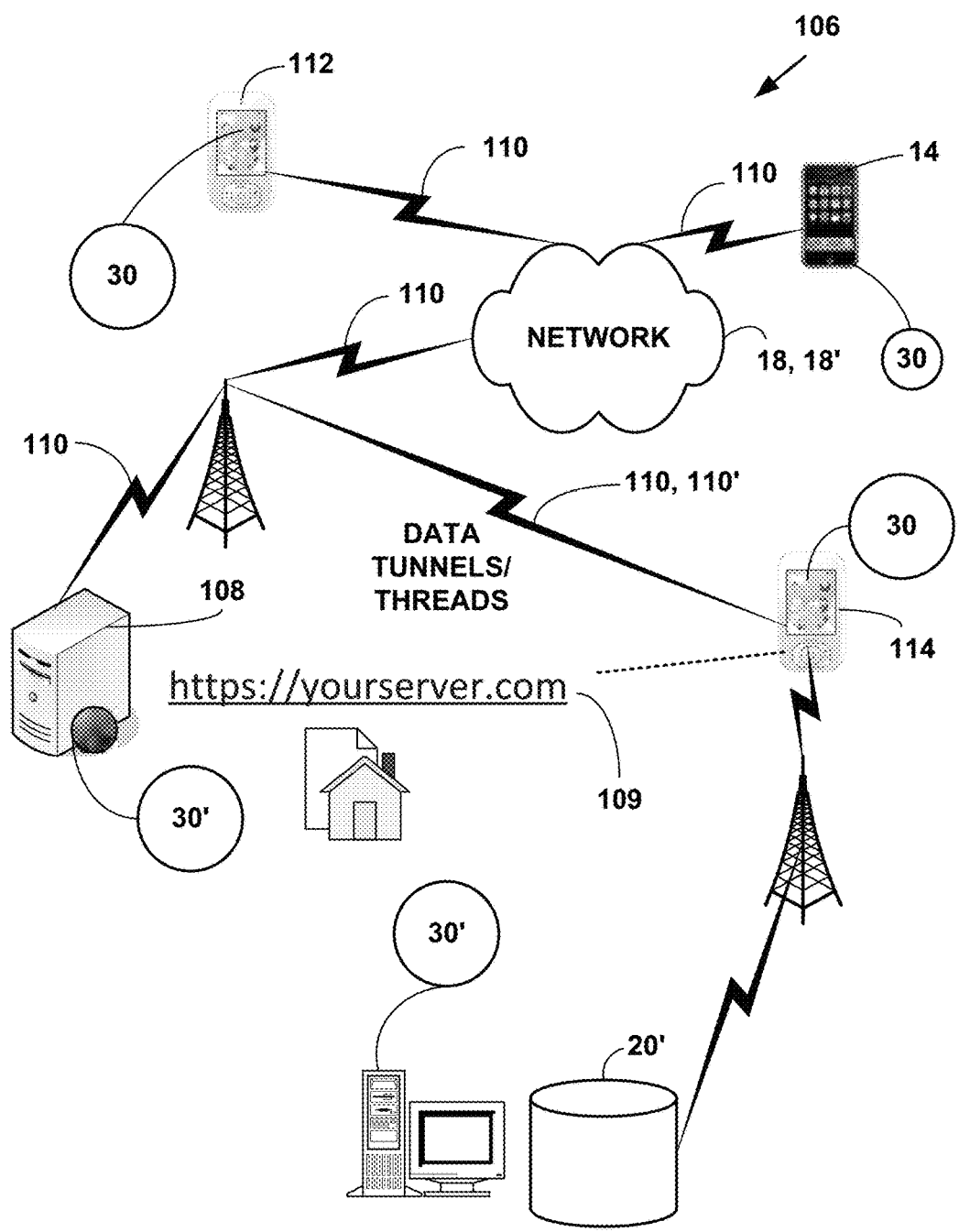
FIG. 7 is a block diagram illustrating a personal network system.

FIG. 7 is a block diagram illustrating a personal network 106. The personal network 106 includes, but is not limited to, a communications network 18, 18', one or more mobile location-aware network devices 12, 14, 16, 27, 112, 114, each with one or more processors and a thin client personal network application 30 in a non-transitory computer readable medium, one or more server network devices 20, 22, 24, 26, 108 each with one or more processors and an intelligent server personal network application 30' in a non-transitory computer readable medium. The intelligent server personal network application 30' includes an intelligent application for managing a personal network topology, for maintaining a current state and a current location, for receiving, storing and sending electronic information for the one or more mobile location-aware network devices 12, 14, 16, 27, 112, 114, via the communications network 18, 18' one or more secure communications channels 110, 110' connecting the one or more mobile location-aware network devices 12, 14, 16, 27, 112, 114 and the one or more server network devices 20, 22, 24, 26, 108 over the communications network 18, 18'. The one or more communications channels 110 comprising secure tunneled communications channels and secure threaded communication channels 110'. However, the present invention is not limited to these component and more or fewer and other types of components can be used to practice the invention. For example, FIG. 6 is a type of personal networks which is composed of all wearable devices.

In one embodiment, the mobile location-aware network devices 12, 14, 16, 27, 112, 114 including a location component 138 (FIG. 9). In another embodiment, location information is manipulated in the non-transitory computer readable medium on the mobile location-aware network devices 12, 14, 16, 27, 112, 114. However, the present invention is not limited to using this location component 138 and more, fewer or other embodiments can be used to practice the invention and the invention can be practiced with or without the location component 138.

The thin client personal network application 30 is an application that depends heavily on the intelligent server personal network application 30' on the one or more server network devices to fulfill its functional and computational needs. In another embodiment, the mobile location-aware network devices 12, 14, 16, 27, 112, 114 includes a "regular," "thick," or "fat" client application to complete its functional and computational needs.

The mobile network devices 12, 14, 16, 27, 112, 114 are location-aware. The thin client personal network application 30 and/or the intelligent server personal network application 30' use mobile device tracking to obtain a current position of the mobile location-aware network devices 12, 14, 16, 27, 112, 114, whether stationary or moving.

Localization may occur either via multilateral of radio signals between (several) radio/cell towers of the communications network 18, 18' and the mobile location-aware network devices 12, 14, 16, 27, 112, 114, or simply via Global Positioning System (GPS).

To locate the mobile location-aware network devices 12, 14, 16, 27, 112, 114, using multi-lateration of radio signals, the devices emit at least a roaming signal to contact the next nearby antenna tower, but the process does not require an active call.

"Mobile positioning," which includes location based service that discloses the actual coordinates of the mobile location-aware network devices 12, 14, 16, 27, 112, 114, is a technology used by telecommunication companies to approximate where a mobile device is, and thereby also its user (bearer), temporarily resides. The more properly applied term locating refers to the purpose rather than a positioning process. Such service is offered as an option of the class of location-based services (LBS).

The technology of locating is based on measuring power levels and antenna patterns and uses the concept that a powered the mobile location-aware network devices 12, 14, 16, 27, 112, 114, always communicates wirelessly with one of the closest base stations, so knowledge of the location of the base station implies the mobile device is nearby.

Advanced systems determine the sector in which the mobile location-aware network devices 12, 14, 16, 27, 112, 114, resides and roughly estimate also the distance to the base station. Further approximation can be done by interpolating signals between adjacent antenna towers. Qualified services may achieve a precision of down to 50 meters in urban areas where mobile traffic and density of antenna towers (base stations) is sufficiently high. Rural and desolate areas may see miles between base stations and therefore determine locations less precisely.

Localization-Based Systems can be broadly divided into: (1) Network-based; (2) Application-based; (3) SIM-based; (4) Hybrid (various combinations of (1)-(3) and (5); and/or (5) Wi-Fi based. However, the present invention is not limited to this embodiment, and more fewer or other types of LBS systems can be used to practice the invention.

Network-based techniques utilize the service provider's network infrastructure 18, 18' to identify the location of the mobile device 12, 14, 16, 27, 112, 114.

Application-based technology 30 determines a location of the mobile location-aware network devices 12, 14, 16, 27, 112, 114, by computing its location by identification, signal strengths of the home and neighboring cell towers, which is continuously sent to the server application 30' server network devices 20, 22, 24, 26, 108 In addition, if the mobile location-aware network devices 12, 14, 16, 27, 112, 114, is also equipped with GPS then significantly more precise location information is then sent.

Subscriber identity module or subscriber identification module (SIM) is an integrated circuit that securely stores the international mobile subscriber identity (IMSI) and the related key used to identify and authenticate subscribers on the mobile location-aware network devices 12, 14, 16, 27, 112, 114. Using SIM, it is possible to obtain raw radio measurements from the mobile location-aware network devices 12, 14, 16, 27, 112, 114. The measurements that are available can include the serving mobile location-aware network devices 12, 14, 16, 27, 112, 114 identification, round trip time and signal strength.

Hybrid positioning systems use a combination of application-based, network-based, GPS-based, etc. and the mobile location-aware network devices 12, 14, 16, 27, 112, 114, technologies for location determination. One example would be some modes of Assisted GPS, which can both use GPS and network information to compute the location of the mobile location-aware network devices 12, 14, 16, 27, 112, 114.

Wi-Fi data can also be used to identify the mobile location-aware network devices 12, 14, 16, 27, 112, 114, location. Poor performance of the GPS-based methods in indoor environments and increasing availability of Wi-Fi network in all types of businesses, have provided new methods to carry out Wi-Fi-based indoor positioning of a the mobile location-aware network devices 12, 14, 16, 27, 112, 114.

In one embodiment, the location component 138 uses a set of coordinates, in two-dimensional (2D) or three-dimensional (3D) (X,Y,Z) space, which are also called "geo-coordinates." However, present invention is not limited to such and embodiment other types of location finding methods may be used to practice the invention.

In one embodiment, the location information of the mobile location-aware network devices 12, 14, 16, 27, 112, 114 is constantly updated in real-time (e.g., milliseconds, seconds, etc.). In another embodiment, the location information is updated in non-real-time time frames (e.g., hours, days, etc.). When the mobile location-aware network devices 12, 14, 16, 27, 112, 114 move, a notification is automatically sent to the other network devices 12, 14, 16, 27, 112, 114, 20, 22, 24, 26, 108 via the communications network 18, 18'. Thus, a current geo-location of the mobile location-aware network devices 12, 14, 16, 27, 112, 114 is always known.

In another embodiment, the mobile location-aware network devices 12, 14, 16, 27, 112, 114 is a "dumb device," that is, it does not know its own location. In such an embodiment, the thin client personal network application 30 on the mobile location-aware network devices 12, 14, 16, 27, 112, 114 periodically sends a signal via the communications network 18, 18' to one or more intelligent server personal network applications 30' on one or more server network device 20, 22, 24, 26, 108. If the mobile device 12, 14, 16, 27, 112, 114 is a dumb device, a location server 20, 22, 24, 26, 108 acts a proxy for the dumb device and the location server automatically determines and always knows the geo-location of the dumb mobile network device 12, 14, 16, 27, 112, 114.

In one embodiment, the current physical location of the mobile location-aware network devices 12, 14, 16, 27, 112, 114 is automatically determined using 2D (X,Y) or 3D (X,Y,Z) space. The 3D (X,Y,Z) space includes a current physical location on land from a known physical point (e.g., longitude and latitude and elevation, cell tower location, etc.) in water and/or in the atmosphere and/or in space. In such an embodiment, the mobile location-aware network devices 12, 14, 16, 27, 112, 114 periodically and automatically send a current location in 2D (X,Y) or 3D (X,Y,Z) space to one or more server network devices 20, 22, 24, 26, 108 on the communications network 18, 18'.

In another embodiment, a current physical location of the mobile location-aware network devices 12, 14, 16, 27, 112, 114 is automatically determined using GPS coordinates (e.g., longitude, latitude, elevation, etc.). The GPS coordinates are obtained from a GPS satellite by the thin client application 30 on the mobile location-aware network devices 12, 14, 16, 27, 112, 114 and/or the intelligent server application 30' on the server network devices 20, 22, 24, 26, 108 via the communications network 18, 18'.

In a preferred embodiment, the one or more server network devices 20, 22, 24, 26, 108 are communications network 18, 18' servers. These servers include an intelligent application 30' for managing a personal network topology, for maintaining a current state and a current location, for receiving, storing and sending electronic information for the one or more mobile location-aware network devices 12, 14, 16, 27, 112, 114.

In one embodiment, the current state of the one or more mobile location-aware network devices 12, 14, 16, 27, 112, 114 includes, on-line, off-line, connected, asleep, awake, monitoring, not monitoring, display on, display off, location-aware on, location aware-off, etc. However, the present invention is not limited to the states described and other states can be used to practice the invention.

In one embodiment, the personal network topology includes a physical personal network topology and/or a logical personal network topology for only known and trusted mobile location-aware network devices 12, 14, 16, 27, 112, 114. That is, unknown and not trusted network devices would not be allowed to join the personal network 106.

The personal network 106 topology includes point-to-point, star, ring or circular, mesh, tree, hybrid, or daisy chain topologies. In one embodiment, the logical network topology binds the one or more mobile location-aware network devices 12, 14, 16, 27, 112, 114 to the one or more server network devices 20, 22, 24, 26, 108 for a specific purpose (e.g., heath monitoring, fitness monitoring, voice communications, social media communications, etc.) However, the present invention is not limited to these network topologies and other embodiments can be used to practice the invention.

In another preferred embodiment, the personal net 106, includes, but is not limited to, a home server network device 108 with one or more processors and an intelligent server personal net application 30', plural secure data tunnels 110 and/or plural secure threaded communications channels 110' connecting the home server network device 108 to a communications network 18, 18' and plural mobile client network devices 112, 114 (only two of which are illustrated) each with one or more processors and each including a thin-client personal net application 30. Thus, a user can create a personal network 106 in their own home connecting all their own network devices and also connecting to their own personal network 106 remotely using their network devices. However, the present invention is not limited to these component and more or fewer and other types of components can be used to practice the invention.

The home server network device 108 offloads CPU and memory intense applications works like a home cloud interconnecting to the Internet or other communications networks including cloud 18', 60 (FIG. 4) and non-cloud 18 (FIG. 1) communications networks. Thus, the plural mobile client network devices 112, 114 are simpler, include less expensive CPUs, include less memory and rely on the home server network device 108 for processing power and to establish communications with other network device and other mobile client network devices 112, 114 on the personal net 106.

The home server network device 108 is low cost (e.g., USD $100). A low cost server means it is economical to create a home cloud computing network 18 (FIG. 4) with multiple home servers connecting to the outside world. The home server network device 108 acts as Internet gateway for authorized mobile client network device clients 30. It is a personal search engine that interacts with other networked devices over traditional Internet service providers. It sends real-time messages to client personal net applications 30 and is push driven and/or profile driven.

In one embodiment, the home server network device 108 manages all computer-based devices at home 12, 14, 16 including smart appliances, home-security devices, smart TV, computers, tablet, etc.

The home server network device 108 also processes data streams including picture and video streams from mobile client over tunnels 110, and/or communication threads 110'. It performs authentication, authorization, and security on behalf of plural mobile client network devices 112, 114 and enable/disables client personal net applications 30.

The home server network device provides secure communications initially to and from the plural mobile client network devices 112, 114 with a predetermined communications channel 109 (e.g., https://yourserver.com, etc.) on the personal network 106.

However, the present invention is not limited to home server network devices 108 and more, fewer and other types of home server network devices 108 can be used to practice the invention.

The home server network device 108 includes server personal net application 30' that recognizes only trusted mobile client network devices 112, 114 via client personal net application 30. In one embodiment, the home server network device 108 uses International Mobile Equipment Identity (IMEI) which is a unique number given to every single mobile phone in combination with a mobile number to recognize the trusted mobile client network devices 112, 114.

IMEI is a 15- or 17-digit code that uniquely identifies mobile phone sets. The IMEI code can enable a GSM (Global System for Mobile communication) or UMTS (Universal Mobile Telecommunications Service) network to prevent a misplaced or stolen phone from initiating calls.

In most mobile communications devices, the IMEI appears on the display when the user enters the character sequence "*#06#" (star-pound-zero-six-pound) into the keypad. The IMEI code may also be printed inside the battery compartment. When a phone set is lost or stolen, the owner can call the CEIR (Central Equipment Identity Register) and blacklist the device according to its IMEI number. After that action, the set will in most cases become useless, even if someone swaps out the unit's SIM card (subscriber identity module).

In another embodiment, a uniform resource identifier (URI) or a uniform resource locator (URL) is used as an identity component. A URI is a string of characters used to identify a name of a resource. Such identification enables interaction with representations of the resource over a network, typically the World Wide Web, using specific protocols. Schemes specifying a concrete syntax and associated protocols define each URI. The most common form of URI is he URL, frequently referred to informally as a web address (e.g., https://yourserver.com). A URI also includes a uniform resource name (URN), which was designed to complement URLs by providing a mechanism for the identification of resources in particular namespaces.

However, the present invention is not limited to these identity components and more fewer and other types of identity components can be used to practice the invention.

In one embodiment, the home server network device 108 creates secure communication channels called data tunnels 110 and/or threaded channels 110' between the trusted mobile client network devices 112, 114 and the home server network device 108 incorporating the IMEI and the mobile phone number of the trusted mobile client network devices 112, 114.

In another embodiment, the one or more server network devices 20, 22, 24, 26 create communication channels called data tunnels 110 and/or threaded channels between the trusted one or more mobile location-aware network devices 12, 14, 16, 27, 112, 114 and the server network device 20, 22, 24, 26 incorporating the IMEI and the mobile phone number of the trusted one or more mobile location-aware network devices 12, 14, 16, 27, 112, 114.

In one embodiment, the server network devices 20, 22, 24, 26 create one or more secure communication channels comprising secure tunneled communications channels 110 and secure threaded communication channels 110'.

The secure data tunnels 110 include logical communication channels to separate airwave bandwidth into multiple data streams. The secure tunnels 110 include any of the security and/or encryption methods described herein and/or security/encryption methods included in the tunneling protocols. Each data tunnel 110 that carries data stream is assigned a unique session identifier. A data stream in a data tunnel 110 is a configurable entity for different levels of quality of service required for the underlying communications. The configuration of data tunnels 110 can be either statically defined or dynamically configured on demand.

A "tunneling protocol" occurs when a network protocol (i.e., the delivery protocol, e.g., IP 46, etc.) encapsulates a different payload protocol. By using tunneling a payload is carried over an incompatible delivery-network and provides secure path through an un-trusted network.

One example of network layer over network layer, is Generic Routing Encapsulation (GRE), a protocol running over IP 46, often serves to carry IP 46 packets, with private addresses, over the Internet using delivery packets with public IP 46 addresses. In this case, the delivery and payload protocols are compatible, but the payload addresses are incompatible with those of the delivery network.

Layer Two Forwarding (L2F) Protocol is a tunneling protocol developed by Cisco Systems, which is similar to Point-to-Point Tunneling Protocol (PPTP) developed by Microsoft. Both protocols enable organizations to set up VPNs that use the Internet backbone for transporting traffic. L2F is supported by other vendors, such as Shiva and Nortel.

In contrast, an IP 46 payload might believe it sees a data link layer 42 delivery when it is carried inside the Layer 2 Tunneling Protocol (L2TP), which appears to the payload mechanism as a protocol of the data link layer 42. L2TP, however, actually runs over the transport layer using UDP 58 over IP 46. The IP 46 in the delivery protocol run over any data-link 42 protocol from IEEE 802.2 over IEEE 802.3 (i.e., standards-based Ethernet) to the Point-to-Point Protocol (PPP).

Layer 2 Tunneling Protocol (L2TP) is an emerging IETF standard and one of the key building blocks for VPNs in the dial access space. L2TP combines the best features of Cisco's Layer 2 Forwarding (L2F) and Microsoft's PPTP, enabling mobile workforces to connect to their corporate intranets or extranets wherever and whenever they require.

Tunneling protocols may use data encryption to transport insecure payload protocols over a public network (such as the Internet), thereby providing Virtual Private Network (VPN) functionality. IP security (IPsec) has an end-to-end Transport Mode, but can also operate in a tunneling mode through a trusted security gateway.

However, the present invention is not limited to these tunneling components and more fewer and other types of tunneling components can be used to practice the invention.

The secure threads 110' include any of the security and/or encryption methods described herein and/or security/encryption methods included in the thread protocols.

A "thread" of execution is the smallest sequence of programmed instructions that can be managed independently by a scheduler, which is typically a part of the operating system of a network device. The implementation of threads and processes differs between operating systems, but in most cases a thread is a component of a process. Multiple threads can exist within the same process and share resources such as memory, while different processes do not share these resources. In particular, the threads of a process share its instructions (i.e., executable code) and its context (i.e., the values of its variables at any given moment).

On a single processor, multithreading is generally implemented by time-division multiplexing (e.g., as in multitasking), and the central processing unit (CPU) switches between different software threads. This context switching generally happens frequently enough that the user perceives the threads or tasks as running at the same time.

On a multiprocessor or multi-core system, threads can be executed in a true concurrent manner, with every processor or core executing a separate thread simultaneously. To implement multiprocessing, the operating system may use hardware threads that exist as a hardware-supported method for better utilization of a particular CPU, and are different from the software threads that are a pure software construct with no CPU-level representation.

Process schedulers of many modern operating systems directly support both time-sliced and multiprocessor threading. The operating system kernel allows programmers to manipulate threads by exposing required functionality through the system call interface. Some threading implementations are called kernel threads, whereas lightweight processes (LWP) are a specific type of kernel threads that shares the same state and information.

Application programs 30, 30' have user-space threads when threading with timers, signals, or other methods to interrupt their own execution, performing a sort of ad hoc time-slicing.

Secure threaded communication channels 110' include secure threaded communications channels including sub-carrier, sub-frequency band, time-slot, logical, and/or channel hopped channels using any of the wired and/or wireless interfaces described herein. However, the present invention is not limited to these threaded communications channels described and more, fewer and other types of threaded communications channels can be used to practice the invention.

In one embodiment, the plural mobile client network devices 112, 114 include lower-end network devices with smaller CPU/memory/storage/power consumption. Multimedia communications are completed over a single integrated circuit or system-on-chip (SoC) 128 (FIG. 9). Voice calls are made over existing cellular networks. The plural mobile client network devices 112, 114 include wearable devices 98-104, 107, 111 (FIG. 6).

The plural mobile client network devices 112, 114 using tunneling 110 and/or threads 110' for video streams and still images to/from home server network device 108. The home server network device 108 do computational services requested by the plural mobile client network devices 112, 114 on demand and/or pre-programmed services.

The plural mobile client network devices 112, 114 have all the features of modern smart phones 12 and tablets 14 but is low cost (e.g., <USD $10), affordable and disposable.

However, the present invention is not limited to these plural mobile client network devices 112, 114 and more or fewer and other types of plural mobile client network devices 112, 114 can be used to practice the invention.

Communications on the Personal Network System

FIG. 8 is a flow diagram illustrating a Method 116 for communications on a personal network system 106. At Step 118, a request message is securely sent from a thin client personal network application on a mobile location-aware network device with one or more processors to an intelligent server personal network application on a home server network device with one or more processors via a personal communications network. At Step 120, the intelligent server personal network application on the home server network devices securely creates a secure communications tunnel via the personal communications network to thin client personal network application on the mobile location-aware network device. At Step 122, the intelligent server personal network application on the home server network device securely sends to the thin client personal network application on the mobile location-aware network device a response message via the created secure communications tunnel on the personal communications network. At Step 124, the intelligent server personal network application on the home server network device securely processes one or more data messages received from thin client personal network application on the mobile location-aware network device via created secure communications tunnel on the personal communications network.

Method 116 is illustrated with one exemplary embodiment. However, the present invention is not limited to this exemplary embodiment and other embodiments can be used to practice the invention.

In such an exemplary embodiment at Step 118, a request message is securely (e.g., RSA, AES, DES, HTTPS, SSL, TLS, etc.) sent from a thin client personal network application 30 on a mobile location-aware network device 112, 114 with one or more processors to an intelligent server personal network application 30' on a home server network device 108 with one or more processors via a personal communications network 106, 18, 18'

In one embodiment, at Step 118, the home server network device 108 provides secure communications initially to and from the plural mobile client network devices 112, 114 via a predetermined secure communications channel 109 (e.g., https://yourserver.com, etc.) on the personal network 106, 18, 18'. However, the present invention is not limited to such an embodiment and other embodiments can be used to practice the invention.

At Step 118, the intelligent server personal network application 30' on home server network device 108 performs authentication, authorization, and security on behalf of plural mobile client network devices 112, 114 and enable/disables thin client personal network application via the predetermined secure communications channel 109 (e.g., https://, etc.) However, the present invention is not limited to this embodiment and other embodiments can be used to practice the invention.

HTTPS (HTTP over SSL or HTTP Secure) is the use of a Secure Socket Layer (SSL) or Transport Layer Security (TLS) as a sublayer under regular HTTP application layering. HTTPS encrypts and decrypts user page requests as well as the pages that are returned by the Web server 108.

At Step 120, the intelligent server personal network application 30' on the home server network device 108 securely creates a secure communications tunnel 110 via the personal communications network 106 to thin client personal network application 30 on the mobile location-aware network device 112, 114.

At Step 122, the intelligent server personal network application 30' on the home server network device 108 securely sends to the thin client personal network application 30 on the mobile location-aware network device 112, 114 a response message via the created secure communications tunnel 110 the personal communications network 106, 18, 18'

At Step 124, the intelligent server personal network application 30' on the home server network device 108 securely processes one or more data messages received from thin client personal network application 30 on the mobile location-aware network device 112, 114, via created secure communications tunnel 110 on the personal communications network 106, 18, 18'. The one more data message include, but are not limited to, voice messages, location messages, heath monitoring messages, fitness messages, social media messages, video messages, etc.

FIG. 9 is a block diagram 126 illustrating components of an exemplary System on Chip (SoC) 128 network device. In one embodiment, one or more mobile location-aware network devices 112, 114 116, include an integrated circuit (IC) comprising a System-on-Chip (SoC) 128 including one or more processors 130, a non-transitory computer readable memory 132, a wireless connection component 134, a voice coder/decoder (CODEC) component 136, a location component 138, a speaker component 140, a microphone component 142 the SoC connectable to a display component 144. In one embodiment, an actual speaker and/or microphone are external to the SoC 128 and the SoC 128 includes only speaker component 140 and microphone component 142 circuitry to control the external microphone and speaker components. However, the present invention is not limited to such an embodiment and more, fewer or other components can be used to practice the invention. In addition, the invention may be practiced with or without an IC SoC 128.

In one embodiment, the CODEC component 136 includes one or more audio codecs (encoder/decoder) including, but not limited to a voice encoder and/or a voice decoder compliant with the ITU-T G.711, G.722, G.723, G.728 and/or G.729 standards, the contents of which are incorporated herein by reference. Global System for Mobile Communications (GSM) codecs can also be used, the contents of which are incorporated by reference. In such an embodiment, the mobile location-aware network devices 12, 14, 16, 112, 114 accept voice commands or other audio inputs such as those from an animal (e.g., dog bark from a service dog, etc.).

In another embodiment, the CODEC component 136 includes a Voice over Internet Protocol 46 (VoIP) CODEC component 136. VoIP is a set of facilities for managing the delivery of voice information using IP 46 packets. In general, VoIP is used to send voice information in digital form in discrete data packets (i.e., IP packets 46, etc.) over data networks rather than using traditional circuit-switched protocols used on the PSTN. VoIP is used on both wireless and wired data networks.

VoIP typically comprises several applications (e.g., Session Initiation Protocol (SIP), Service Location Protocol (SLP), H.323, H.324, Domain Name System (DNS), Authentication Authorization and Accounting (AAA), codecs (G.7xx), etc. the contents of all of which are incorporated herein by reference.) that convert a voice signal into a stream of packets (e.g., IP 46 packets) on a packet network and back again. VoIP allows voice signals to travel over a stream of data packets over a communications network.

However, the present invention is not limited to such embodiments and other embodiments can be used to practice the invention.

FIG. 10 is a flow diagram illustrating a Method 146 for communications on a personal network system. At Step 148, a voice activated request message from a thin client personal network application on a mobile location-aware network device with one or more processors is securely sent to an intelligent server personal network application on a home server network device with one or more processors via a personal communications network. At Step 150, the intelligent server personal network application on the home server network device securely creates a secure communications tunnel and/or a secure communications thread via the personal communications network to thin client personal network application on the mobile location-aware network device. At Step 152, the intelligent server personal network application on the home server network device securely sends to the thin client personal network application on the mobile location-aware network device a response message via the created secure communications tunnel and/or the created secure communications thread on the personal communications network. At Step 154, the intelligent server personal network application on the home server network device securely processes one or more data messages received from thin client personal network application on the mobile location-aware network device via created secure communications tunnel and/or the created secure communications thread on the personal communications network.

Method 146 is illustrated with one exemplary embodiment. However, the present invention is not limited to this exemplary embodiment and other embodiments can be used to practice the invention.

In such an exemplary embodiment at Step 148, a voice activated request message from a thin client personal network application 30 on a mobile location-aware network device 12 112, 114 with one or more processors is securely sent to an intelligent server personal network application 30' on a home server network device 20, 108 with one or more processors via a personal communications network 106, 18, 18'.

At Step 150, the intelligent server personal network application 30' on the home server network device 20, 22, 24, 26, 108 securely creates a secure communications tunnel 110 and/or a secure communications thread 110' via the personal communications network 106, 18, 18' to thin client personal network application 30 on the mobile location-aware network device 14, 112, 114.

At Step 152, the intelligent server personal network application 30' on the home server network device 20, 108 securely sends to the thin client personal network application 30 on the mobile location-aware network device 14,112, 114 a response message via the created secure communications tunnel 110 and/or the created secure communications thread 110' on the personal communications network 106, 18, 18'.

At Step 154, the intelligent server personal network application 30' on the home server network device 20, 108 securely processes one or more data messages received from thin client personal network application 30 on the mobile location-aware network device 14, 112, 114 via created secure communications tunnel 110 and/or the created secure communications thread 110' on the personal communications network 106, 18, 18'. The one more data message include, but are not limited to, voice messages, location messages, heath monitoring messages, fitness sensor messages, social media messages, video messages, etc.

Figure 11B:
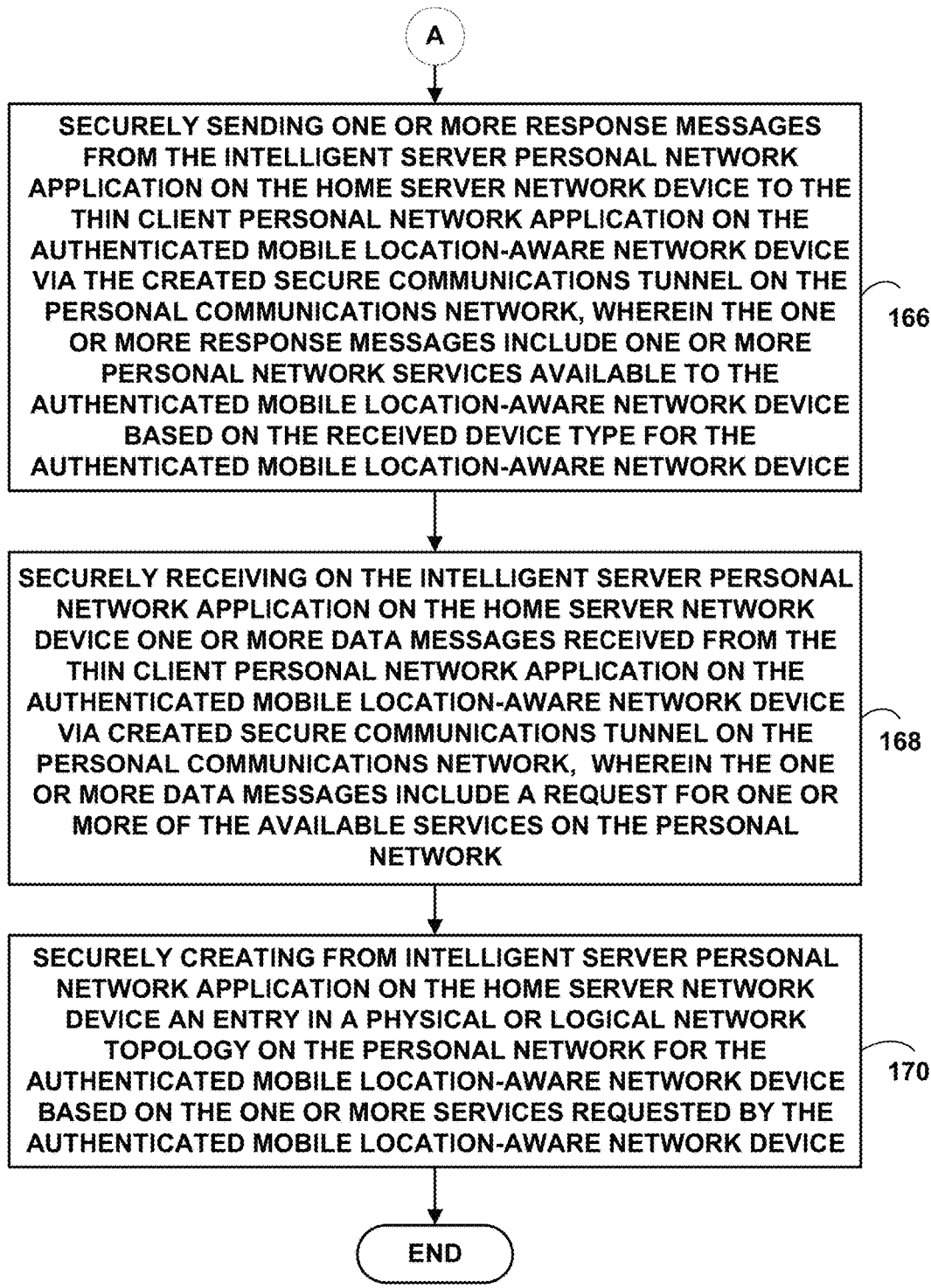

FIGS. 11A and 11B are a flow diagram illustrating a Method 158 for communications on a personal network system. In FIG. 11A at Step 160 a device registration message from a thin client personal network application on a mobile location-aware network device with one or more processors is securely received on an intelligent server personal network application on a home server network device with one or more processors via a personal communications network. The device request message includes at least a device type and a network address for the mobile location-aware network device. At Step 162, the mobile location-aware network device is securely authenticated from intelligent server personal network application on the home server network device. At Step 164, a secure communications tunnel is securely created from the intelligent server personal network application on the home server network device to the thin client personal network application on the authenticated mobile location-aware network device via the personal communications network. In FIG. 11B at Step 166, one or more response messages are securely sent from the intelligent server personal network application on the home server network device to the thin client personal network application on the authenticated mobile location-aware network device via the created secure communications tunnel on the personal communications network. The one or more response messages include one or more personal network services available to the authenticated mobile location-aware network device based on the received device type for the authenticated mobile location-aware network device. At Step 168, the intelligent server personal network application on the home server network device securely receives one or more data messages from the thin client personal network application on the authenticated mobile location-aware network device via created secure communications tunnel on the personal communications network. The one or more data messages include a request for one or more of the available services on the personal network. At Step 170, the intelligent server personal network application on the home server network devices securely creates an entry in a physical or logical network topology on the personal network for the authenticated mobile location-aware network device based on the one or more services requested by the authenticated mobile location-aware network device.

Method 158 is illustrated with one exemplary embodiment. However, the present invention is not limited to this exemplary embodiment and other embodiments can be used to practice the invention. In such an exemplary embodiment in FIG. 11A at Step 160 a device registration message from a thin client personal network application 30 on a mobile location-aware network device (e.g., 112, etc.) with one or more processors is securely received on an intelligent server personal network application 30' on a home server network device 108 with one or more processors via a personal communications network 106, 18, 18' The device request message includes at least a device type and a network address for the mobile location-aware network device 112.

At Step 162, the mobile location-aware network device 112, 114 is securely authenticated from intelligent server personal network application 30' on the home server network device 108

At Step 164, a secure communications tunnel 110 is securely created from the intelligent server personal network application 30' on the home server network device 20, 108 to the thin client personal network application 30 on the authenticated mobile location-aware network device 112 via the personal communications network 106, 18, 18'. In another embodiment, a secure communications thread 110' is created instead of the secure communications tunnel 110. In another embodiment, a combinations of secure communications tunnels 110 a secure communications thread 110' is created.

In FIG. 11B at Step 166, one or more response messages are securely sent from the intelligent server personal network application 30' on the home server network device 20, 108 to the thin client personal network application 30 on the authenticated mobile location-aware network device 112 via the created secure communications tunnel 110 on the personal communications network 106, 18, 18' The one or more response messages include one or more personal network services (e.g., voice, health monitoring, fitness monitoring, location, social media, video, etc.) available to the authenticated mobile location-aware network device 112 based on the received device type for the authenticated mobile location-aware network device 112.

At Step 168, the intelligent server personal network application 30' on the home server network device 108 securely receives one or more data messages from the thin client personal network application 30 on the authenticated mobile location-aware network device 112 via created secure communications tunnel 110 on the personal communications network 106. The one or more data messages include a request for one or more of the available services (e.g., voice, health monitoring, fitness monitoring, location, social media, video, etc.) on the personal network 106.

At Step 170, the intelligent server personal network application 30' on the home server network device 108 securely creates an entry in a physical or logical network topology on the personal network 106 for the authenticated mobile location-aware network device 112 based on the one or more services requested by the authenticated mobile location-aware network device 112.

In one embodiment, Method 158 logically links mobile location aware network devices or other types of mobile clients to form a personal network performing specific functions for data or voice communications. However, the present invention is not limited to this embodiment and other embodiments can be used to practice the invention.

The method and system descried herein provide a personal network that includes, but is not limited to: (1) security as only known and trusted mobile location-aware network devices are allowed to join the personal network and communications is through secure tunnels or via secure threads; (2) low cost as the thin mobile client application only processes simple events and let the remote server(s) do most of the work if not all. Therefore, the thin mobile client can be implemented easily with fewer electronic components. For example, a single IC (System-on-Chip) with a size of few millimeter and cost under USD $10 so the mobile location-aware network devices are wearable, portable and disposable; (3) various mobile location-aware network devices are configured into logical topologies for performing specific functions (e.g., health, fitness, voice, etc.); (4) use home based local and/or remote servers with intelligent server applications that interact with the thin mobile client applications and provide processing power and functionality for the thin client applications; (5) Simple operation as mobile clients are attached to a personal network by registering their presence and capability, (e.g., "I am a display and here is my IP address and identifier") to a local and/or remote server autonomously. During the registration process the local/remote server publishes available services to compatible mobile clients. New services can be published/subscribed to any time after the registration stag. Remote/local server keeps a topology of the personal network so that the server also knows the state of the clients. The server may initiate a network management command to update the health of the network and the location-aware mobile network devices. For example, a broadcast request to get topology update from the mobile client on the personal network; and (6) The local/remote server authenticates only trusted mobile clients for every connections through any or a combination of the following, but not limited to: voice recognition, IP address, IMEI, unique device ID, finger print, other user biometric, password challenge, etc.

The method and system described herein also provide, but is not limited to, at least the following advantages: (1) Thin mobile client+remote intelligence (home server and personal network)=today's smart phone; (2) Thin mobile client=lower cost to consumer; (3) Tunneling (thread) based communication between mobile client and home server=maximum security; (4) Personal search engine with an at home server on a personal network=maximum privacy; (5) The "Personal Net" reduces the cost of phone and service yet without compromising phone's ability to do multimedia communications for which a smart phone was intended; (6) Consumers need affordable solution; (7) Simple mobile client to reduce cost and weight; (8) Home servers offload CPU and memory intense applications from thin mobile client works like a home cloud interconnecting to Internet; and (9) Unique data tunnels/threads between mobile clients and home server(s).

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software via one or more processors, in other embodiments, hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A personal network system, comprising in combination:
 a communications network;
 one or more mobile location-aware network devices each with one or more processors and a thin client personal network application in a non-transitory computer readable medium, including a network address, a device type, a unique device identifier, a display type, a current geographic location, power level information including power levels of receive and transmit signals of the one or more mobile location-aware network devices, voice activation information and signal strength information including cell tower signals, global positioning system (GPS) signals and Radio Frequency (RF) signals;
 one or more server network devices each with one or more processors and an intelligent server personal network application in a non-transitory computer readable medium connected to the communications network,
 the intelligent server personal network application including an intelligent application for managing a personal network topology, for managing the voice activation information, for maintaining a current state for the one or more mobile location-aware network devices comprising: on-line, off-line, connected, asleep, awake, monitoring, not monitoring, display on, display off, location-aware-on or location aware-off, and maintaining a current geographic location for the one or more mobile location-aware network devices, for receiving, storing and sending electronic information for the one or more mobile location-aware network devices via the communications network, the electronic information including computational services information, the voice activation information and authentication information, authorization information, and security information for the one or more mobile location-aware devices; and
 one or more secure communications channels connecting the one or more mobile location-aware network devices and the one or more server network devices over the communications network, the one or more communications channels comprising tunneled communications channels and threaded communication channels.

2. The personal network system of claim 1 wherein selected ones of the mobile location-aware network devices each has a unique identification for registering to a home or remote server when forming a personal network, wherein the thin client personal network application and the intelligent server application manage the state of the one or more mobile location-aware network devices registration over a life cycle of a personal network.

3. The personal network system of claim 1 wherein the communications network includes a wired communications, a wireless communications network.

4. The personal network system of claim 1 wherein the communications network includes a cloud communications network and the intelligent server personal network application on the server network devices stores electronic information received from the one or more thin client personal network applications on the mobile location-aware network devices in a plurality of cloud storage objects, wherein the plurality of cloud storage objects include a plurality of cloud storage objects stored with REpresentational State Transfer (REST) protocol, Simple Object Access Protocol (SOAP), or Lightweight Directory Access Protocol (LDAP).

5. The personal network system of claim 1 wherein the one or more mobile location-aware network devices include, voice-activated devices, a display, desk top computers, laptop computers, tablet computers, mobile phones, three-dimensional (3D) printer, robots, smart phones, Internet phones, Internet appliances, personal digital/data assistants (PDA), digital cameras, portable game consoles, game consoles, cable television (CATV), satellite television (SATV) and Internet television set-top boxes, digital televisions including high definition television (HDTV), three-dimensional (3DTV) televisions, health monitoring devices, fitness devices, wearable devices, disposable devices, treadmills, exercise bicycles, remote controls and unmanned aerial vehicles (UAVs).

6. The personal network system of claim 1 wherein the one or more mobile location-aware network devices include an integrated circuit (IC) comprising a System-on-Chip (SoC) including a processor, a non-transitory computer readable memory, a wireless connection component, a voice coder/decoder (CODEC) component, a location component, a speaker component, a microphone component, the SoC connectable to a display component.

7. The personal network system of claim 6 wherein one or more mobile location-aware network devices with the SoC include wearable mobile location-aware network devices.

8. The personal network system of claim 1 wherein the one or more mobile location-network devices are voice activated.

9. The personal network system of claim 1 wherein the thin client personal network application sends a network address, a device type, a unique device identifier, a display type, a current geographic location and a first set of electronic information including power level information including power levels of receive and transmit signals of the one or more mobile location-aware network devices, voice activation information and signal strength information including cell tower signals, global positioning system (GPS) signals and timing signals, from a mobile location-aware network device via the communications network to the intelligent server personal network application on the server network device and the thin client personal network application receives a second set of electronic information including computational services information, the voice activation information and authentication information, authorization information, and security information back from the intelligent server personal network application on the server network device.

10. The personal network system of claim 1 wherein a thin client personal network application unique device identifier includes a unique Uniform Resource Locator (URL), Uniform Resource Identifier (URI), Uniform Resource Name (URN), an International Mobile Equipment Identifier (IMEI), a mobile device number, or a Medium Access Control (MAC) address and wherein the thin client personal network application network address includes an Internet Protocol (IP) address.

11. The personal network system of claim 1 wherein selected ones of the server network devices are located in a personal home location and other server network devices are located in a location other than the personal home location and selected ones of the mobile location-aware network devices are located in the personal home location and other selected ones of the mobile location-aware network devices are moving or located in a location other than on the personal home location.

12. The personal network system of claim 1 wherein the one or more secure communications channels comprising tunneled communications channels include Layer 2 Tunneling Protocol (L2TP) channels, Point-To-Point Tunneling Protocol (PPTP) channels, Generic Routing Encapsulation (GRE) channels, Layer 2 Forwarding Protocol (L2F) channels or IP Security (IPsec) channels.

13. The personal network system of claim 1 wherein the one or more secure communications channels comprising secure threaded communications channels include sub-carrier, sub-frequency band, time-slot, logical, or channel hopped, secure threaded channels.

14. The personal network system of claim 1 wherein the personal network topology includes a physical personal network topology and a logical personal network topology for only known and trusted mobile location-aware network devices and wherein the personal network topology includes point-to-point, star, ring or circular, mesh, tree, hybrid, or daisy chain, physical or logical topologies.

15. The personal network system of claim 1 wherein the one or more location-aware network devices include network-based, application-based, Subscriber Identification Module (SIM)-based, Hybrid based, Wireless Fidelity (Wi-Fi) based or Global Positioning System (GPS)-based, location awareness.

16. The personal network system of claim 1 wherein the mobile location-aware network device includes a Radio Frequency IDentifier (RFID) network device or a mesh network device.

17. The personal network system of claim 1 wherein the one or more mobile location-aware network devices include a wireless interface for wireless near field communications (NFC), machine-to-machine (M2M) communications or Bluetooth communications.

18. A method for communications on a personal network system, comprising:
sending a request message from a thin client personal network application on a mobile location-aware network device with one or more processors to an intelligent server personal network application on a home server network device with one or more processors via a personal communications network, wherein the request message includes a network address, a device type, a unique device identifier, a display type, a current geographic location and a first set of electronic information including voice activation information, power level information including power levels of receive and transmit signals of the mobile location-aware network device and signal strength information including cell tower signals, global positioning system (GPS) signals and Radio Frequency (RF) signals for the mobile location-aware network device;
creating from the intelligent server personal network application on the home server network device a communications tunnel via the personal communications network to thin client personal network application on the mobile location-aware network device;
sending from the intelligent server personal network application on the home server network device to the thin client personal network application on the mobile location-aware network device a response message via the created communications tunnel on the personal communications network, wherein the response message includes computational services information, the voice activation information and authentication information, authorization information, and security information; and processing on the intelligent server personal network application on the home server network device one or more data messages received from the thin client personal network application on the mobile location-aware network device via created communications tunnel on the personal communications network.

19. A method for communications on a personal network system, comprising:

sending a voice activated request message from a thin client personal network application on a mobile location-aware network device with one or more processors to an intelligent server personal network application on a home server network device with one or more processors via a personal communications network, wherein the voice activated request message includes a network address, a device type, a unique device identifier, a display type, a current geographic location and a first set of electronic information including voice activation signal information, power level information including power levels of receive and transmit signals of the mobile location-aware network device and signal strength information including cell tower signals, global positioning system (GPS) signals and Radio Frequency (RF) signals for the mobile location-aware network device;

creating from the intelligent server personal network application on the home server network device a communications tunnel or a secure communications thread via the personal communications network to thin client personal network application on the mobile location-aware network device;

sending from the intelligent server personal network application on the home server network device to the thin client personal network application on the mobile location-aware network device a response message via the created communications tunnel or the created secure communications thread on the personal communications network, wherein the response message includes computational services information, the voice information and authentication, authorization, and security information; and processing on the intelligent server personal network application on the home server network device one or more data messages received from the thin client personal network application on the mobile location-aware network device via created communications tunnel or the created secure communications thread on the personal communications network.

20. A method for communications on a personal network system, comprising:

receiving a device registration message from a thin client personal network application on a mobile location-aware network device with one or more processors on an intelligent server personal network application on a home server network device with one or more processors via a personal communications network, wherein the device registration message includes at least a device type and network address, a unique device identifier, a display type, a current geographic location and a first set of electronic information including power level information including power levels of receive and transmit signals of the mobile location-aware network device, voice activation information and signal strength information including cell tower signals, global positioning system (GPS) signals and Radio Frequency (RF) signals for the mobile location-aware network device;

authenticating the mobile location-aware network device from intelligent server personal network application on the home server network device;

creating a communications tunnel from the intelligent server personal network application on the home server network device to the thin client personal network application on the authenticated mobile location-aware network device via the personal communications network;

sending one or more response messages from the intelligent server personal network application on the home server network device to the thin client personal network application on the authenticated mobile location-aware network device via the created communications tunnel on the personal communications network, wherein the one or more response messages include one or more personal network services available to the authenticated mobile location-aware network device based on the received device type for the authenticated mobile location-aware network device and computational services information, the voice activation information, authentication information, authorization information, and security information;

receiving on the intelligent server personal network application on the home server network device one or more data messages received from the thin client personal network application on the authenticated mobile location-aware network device via created communications tunnel on the personal communications network, wherein the one or more data messages include a request for one or more of the available services on the personal network; and creating from intelligent server personal network application on the home server network device an entry in a physical or logical network topology on the personal network for the authenticated mobile location-aware network device based on the one or more services requested by the authenticated mobile location-aware network device.

* * * * *